US011953727B2

United States Patent
Yu et al.

(10) Patent No.: US 11,953,727 B2
(45) Date of Patent: Apr. 9, 2024

(54) HYBRID INTEGRATION PROCESS AND DEVICES

(71) Applicant: ROCKLEY PHOTONICS LIMITED, Altrincham (GB)

(72) Inventors: Guomin Yu, Glendora, CA (US); Aaron John Zilkie, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 245 days.

(21) Appl. No.: 17/318,834

(22) Filed: May 12, 2021

(65) Prior Publication Data

US 2021/0356663 A1 Nov. 18, 2021

(30) Foreign Application Priority Data

May 13, 2020 (GB) ...................................... 2007016

(51) Int. Cl.
| | |
|---|---|
| *G02B 6/125* | (2006.01) |
| *G02B 6/122* | (2006.01) |
| *G02B 6/13* | (2006.01) |
| *G02B 6/136* | (2006.01) |
| G02B 6/12 | (2006.01) |

(52) U.S. Cl.
CPC ........... *G02B 6/125* (2013.01); *G02B 6/1228* (2013.01); *G02B 6/131* (2013.01); *G02B 6/136* (2013.01); *G02B 2006/12142* (2013.01); *G02B 2006/12152* (2013.01)

(58) Field of Classification Search
None
See application file for complete search history.

(56) References Cited

U.S. PATENT DOCUMENTS

| | | | | |
|---|---|---|---|---|
| 4,729,618 | A | * 3/1988 | Yoshida | ................ G02F 1/3133 |
| | | | | 385/14 |
| 6,266,468 | B1 | * 7/2001 | Rickman | ................ G02B 6/122 |
| | | | | 385/44 |
| 10,641,959 | B1 | 5/2020 | Park | |
| 2004/0075098 | A1 | 4/2004 | Hamilton | |
| 2011/0243494 | A1 | * 10/2011 | Hasegawa | .............. G02B 6/122 |
| | | | | 385/14 |
| 2016/0327759 | A1 | * 11/2016 | Keyvaninia | ......... H01L 31/1035 |

FOREIGN PATENT DOCUMENTS

| | | |
|---|---|---|
| EP | 3 091 381 A1 | 11/2016 |
| EP | 3 471 221 A1 | 4/2019 |

OTHER PUBLICATIONS

U.K. Intellectual Property Office Search and Examination Report, dated Oct. 26, 2020, for Patent Application No. GB2007016.5, 6 pages.
U.K. Intellectual Property Office Examination Report, dated Mar. 11, 2022, for Patent Application No. GB2007016.5, 3 pages.

* cited by examiner

*Primary Examiner* — Chad H Smith
(74) *Attorney, Agent, or Firm* — Lewis Roca Rothgerber Christie LLP

(57) ABSTRACT

A device coupon for use in a hybrid integration process with a silicon platform. The device coupon comprises: an input waveguide, including an input facet; an active waveguide, coupled to the input waveguide, the active waveguide including a III-V semiconductor based electro-optical device; and an output waveguide, configured to couple light between the active waveguide and an output facet. The input waveguide and output waveguide are passive waveguides.

20 Claims, 35 Drawing Sheets

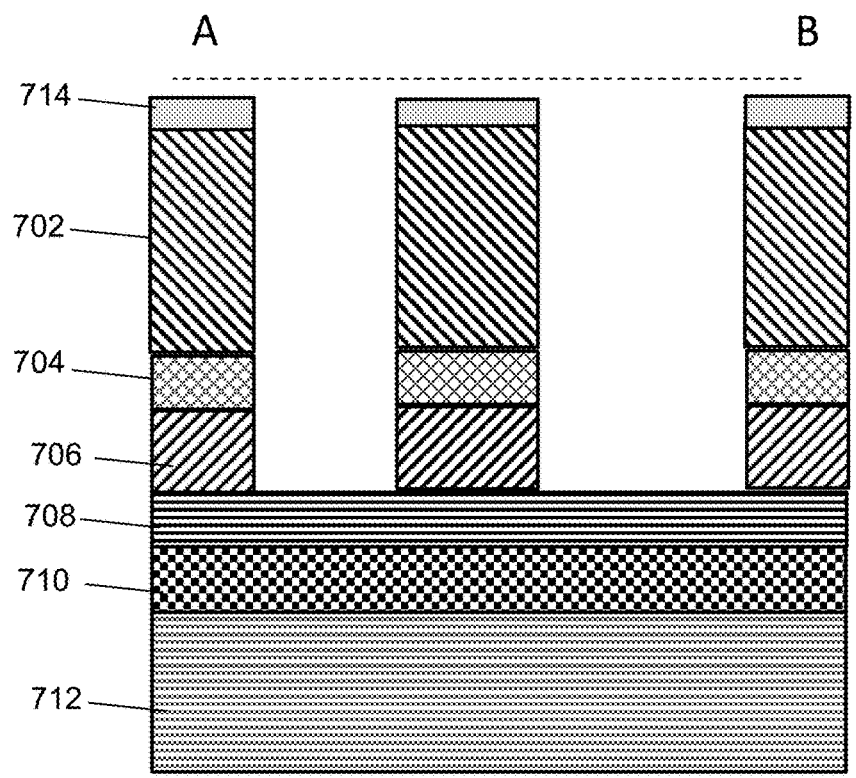
Fig. 13(ii')(A)
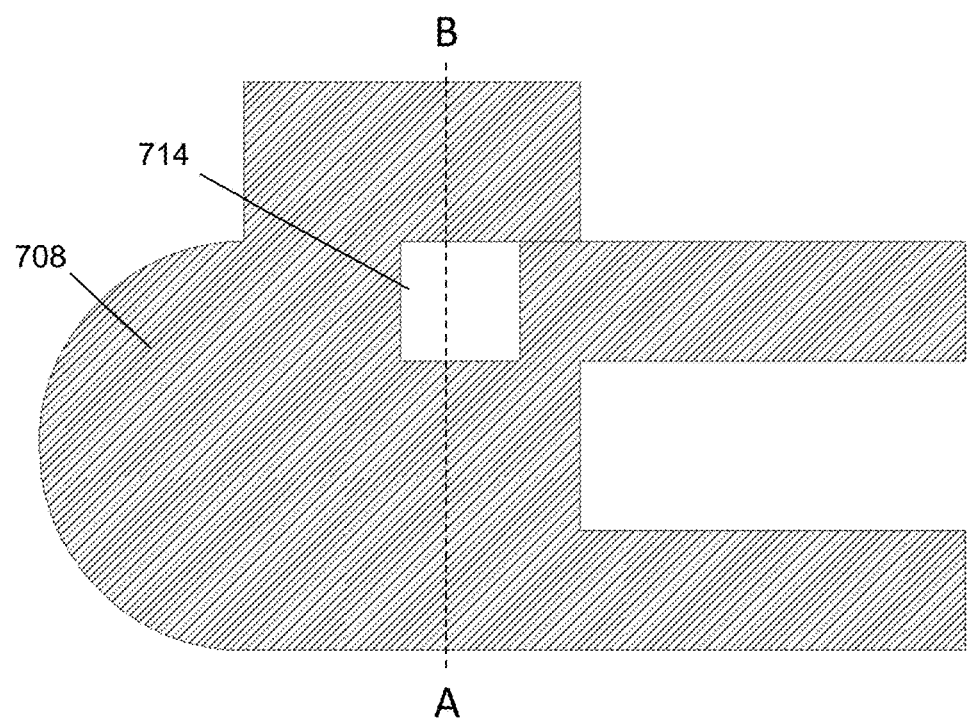
Fig. 13(ii')(B)

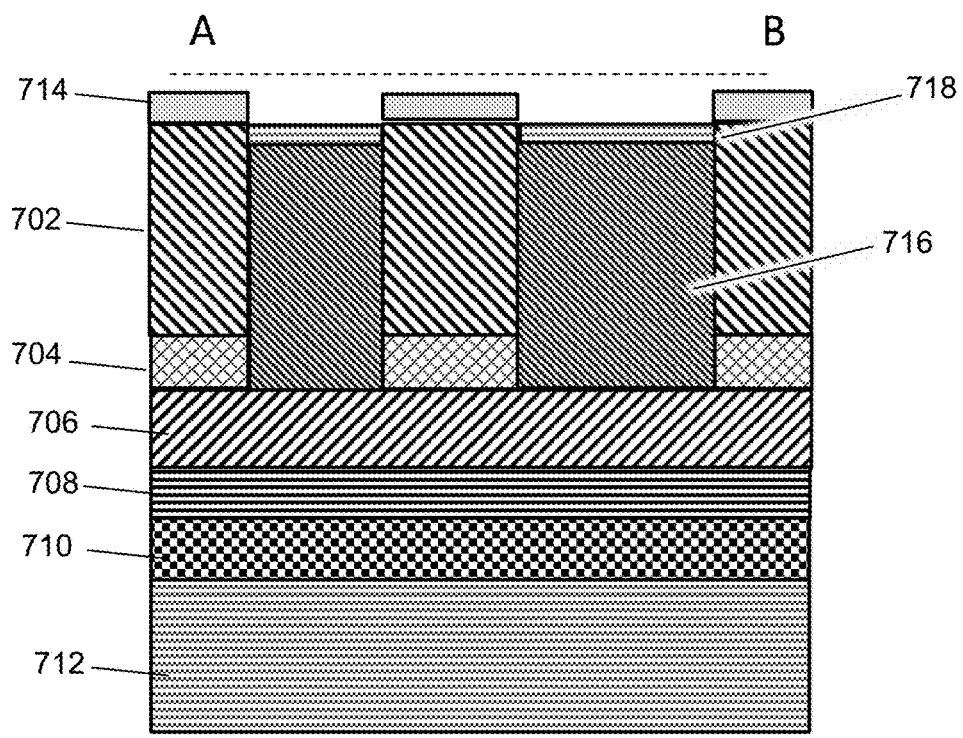
Fig. 13(iii)(A)
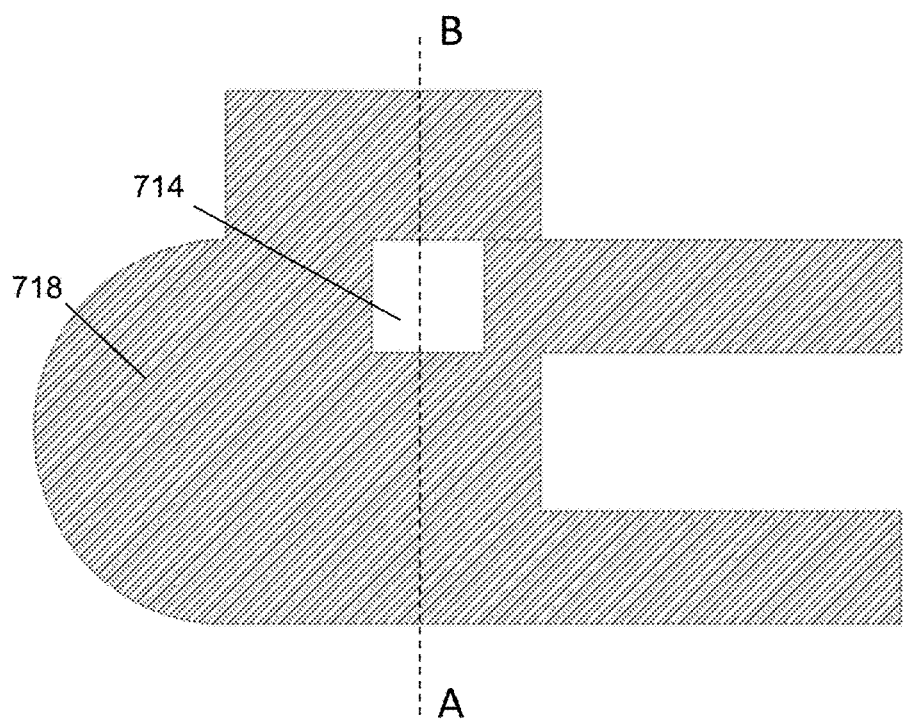
Fig. 13(iii)(B)

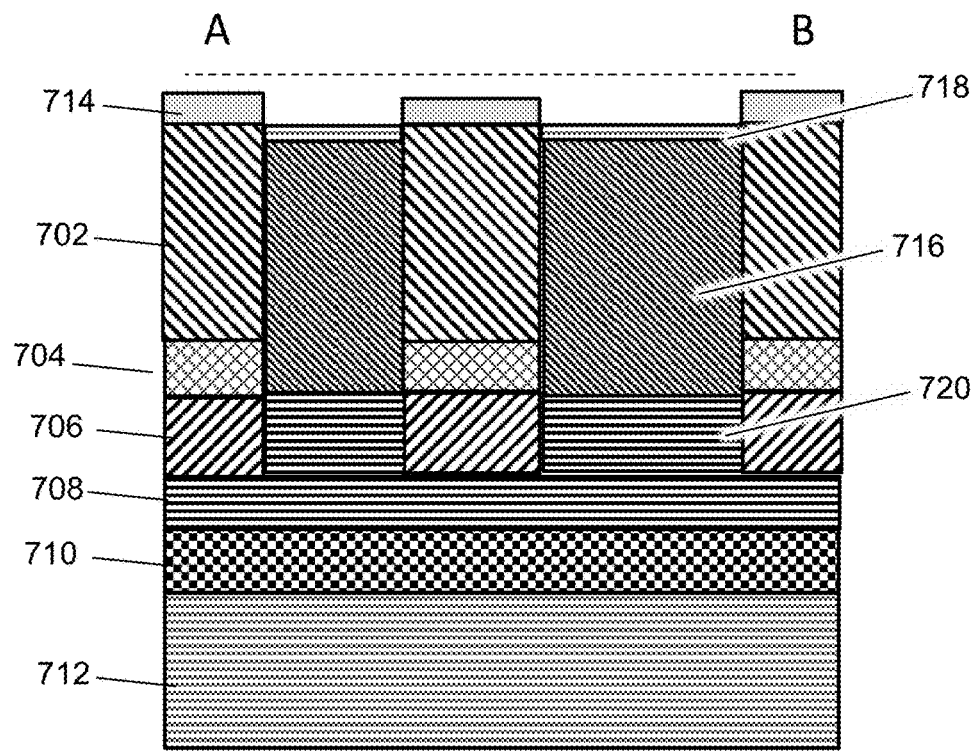
Fig. 13(iii')(A)
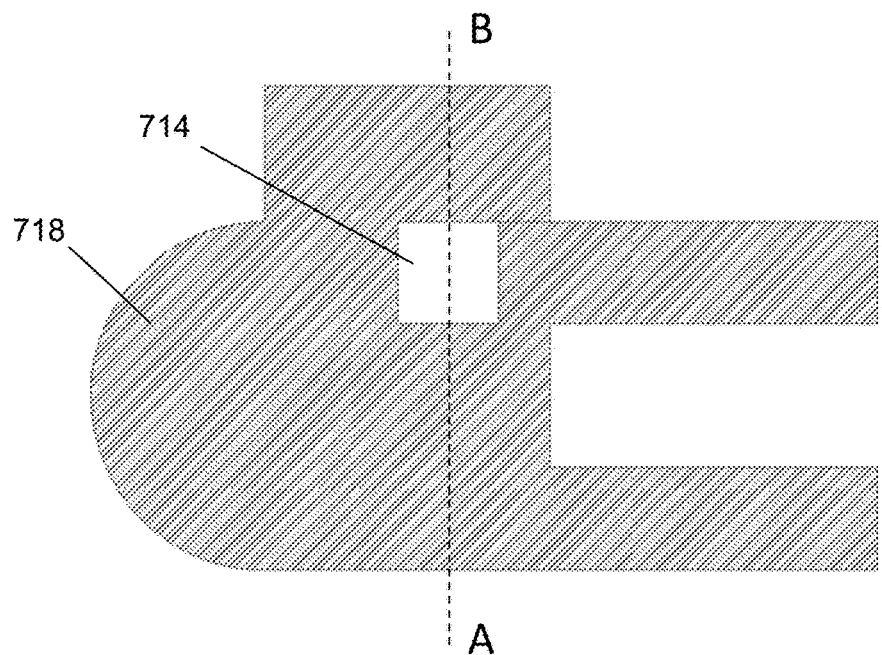
Fig. 13(iii')(B)

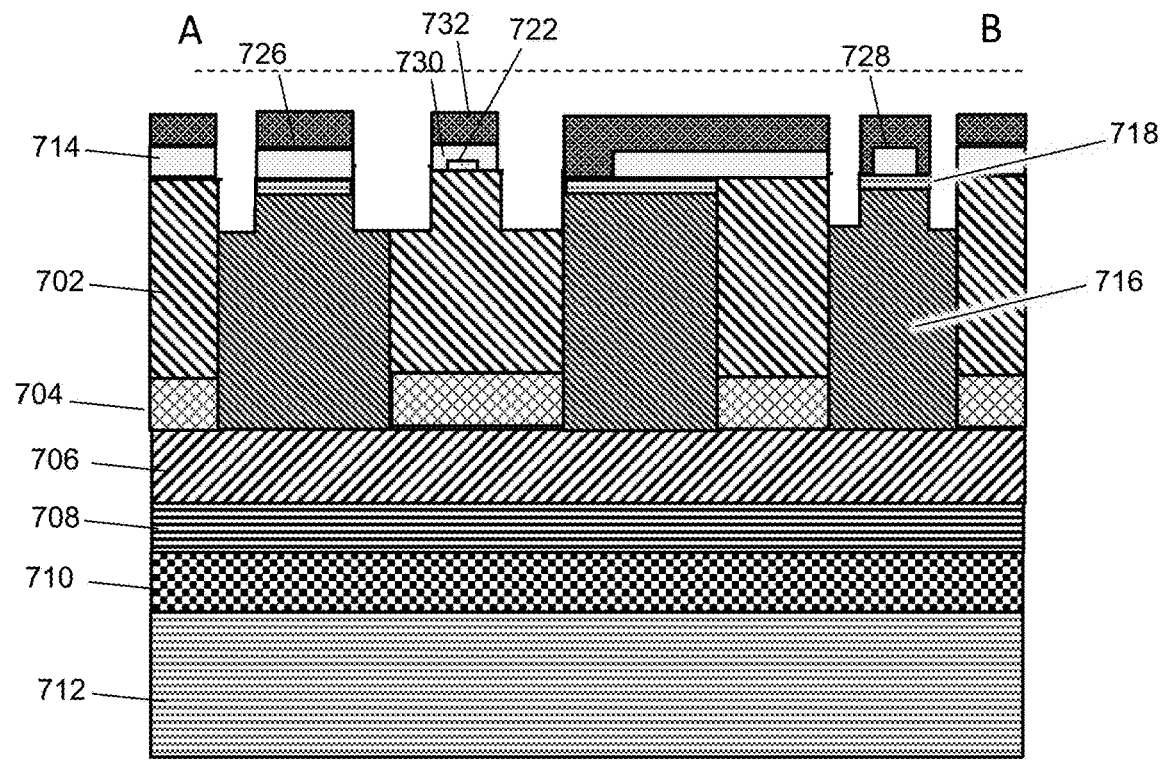
Fig. 13(vii)(A)
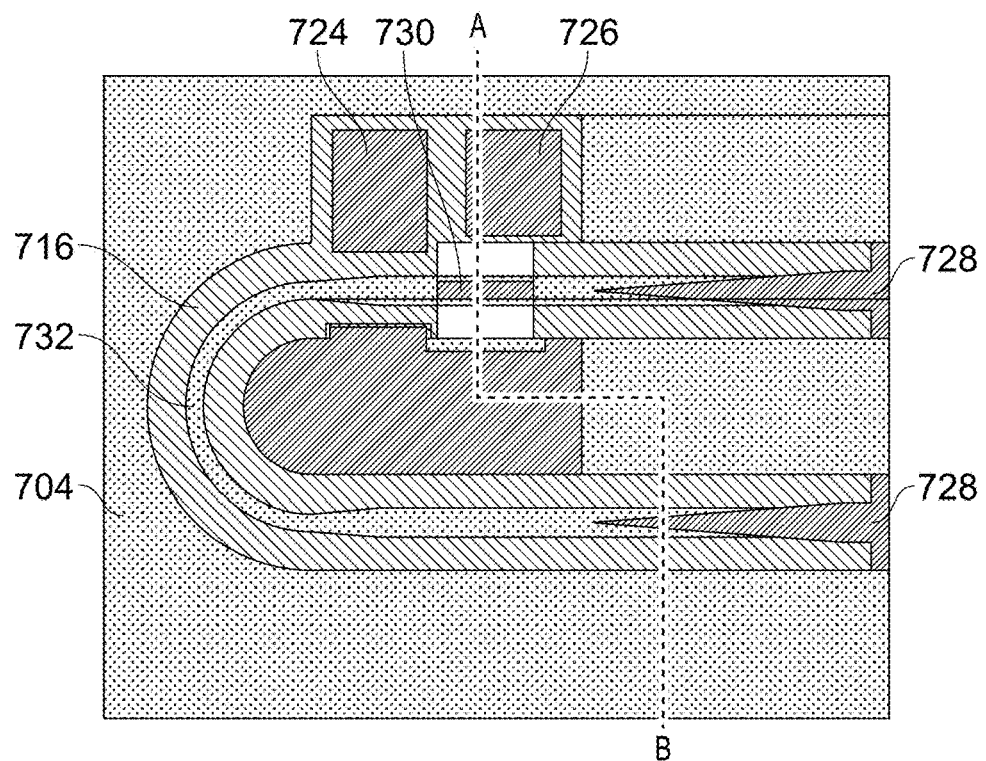
FIG. 13(vii)(B)

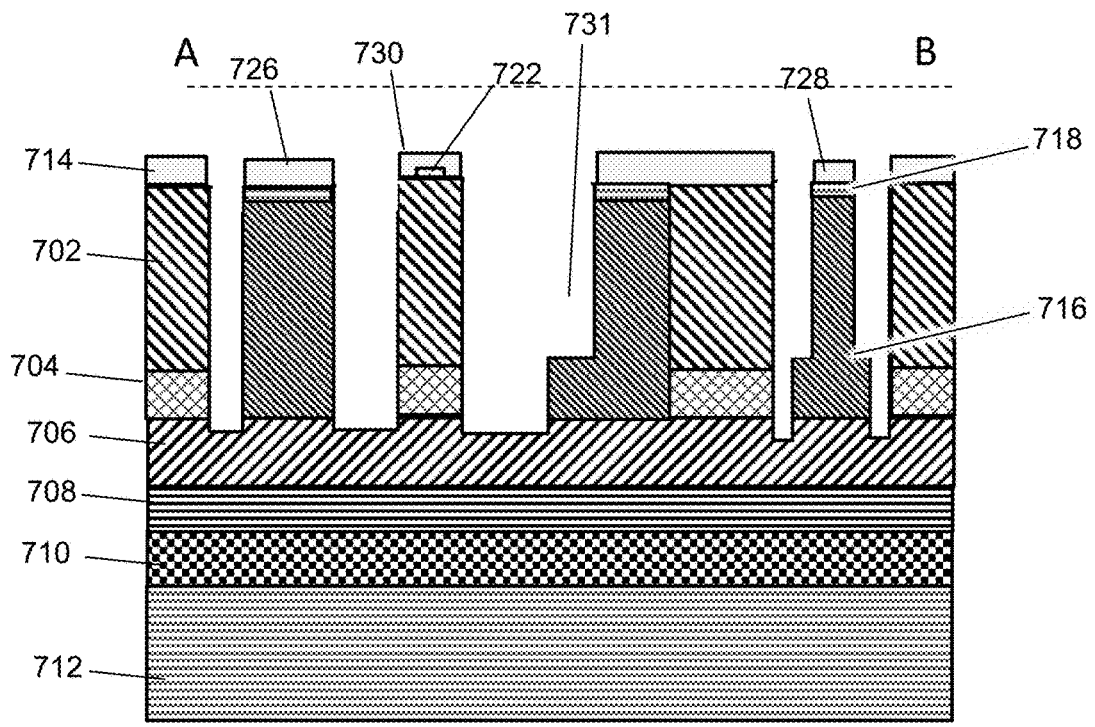
Fig. 13(viii)(A)
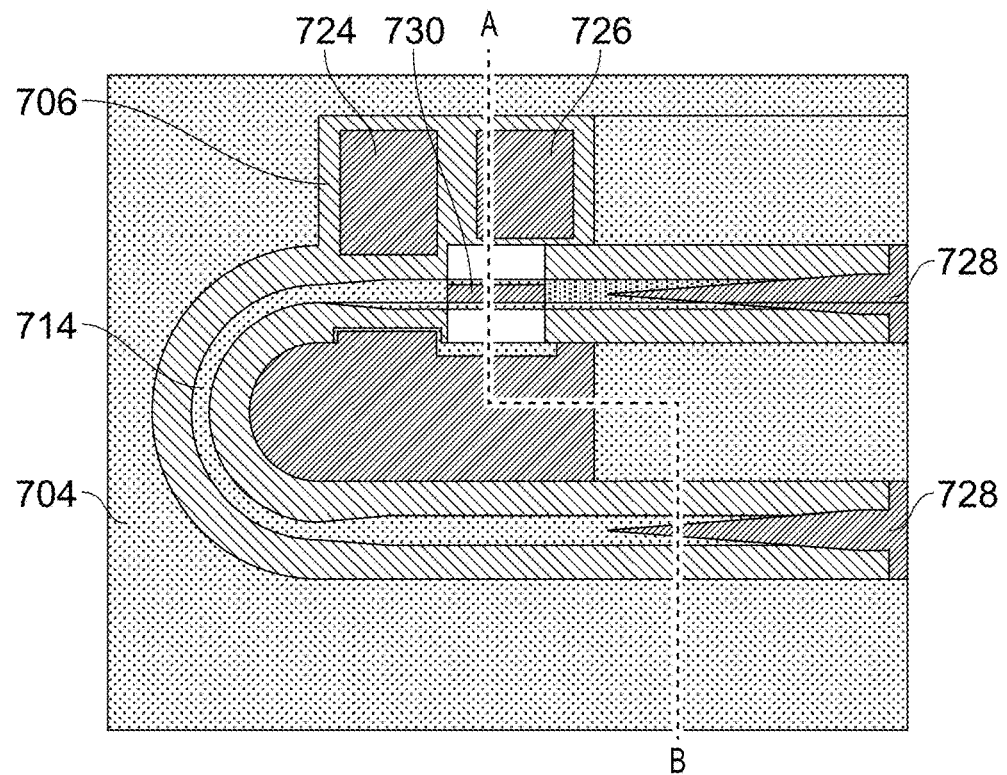
FIG. 13(viii)(B)

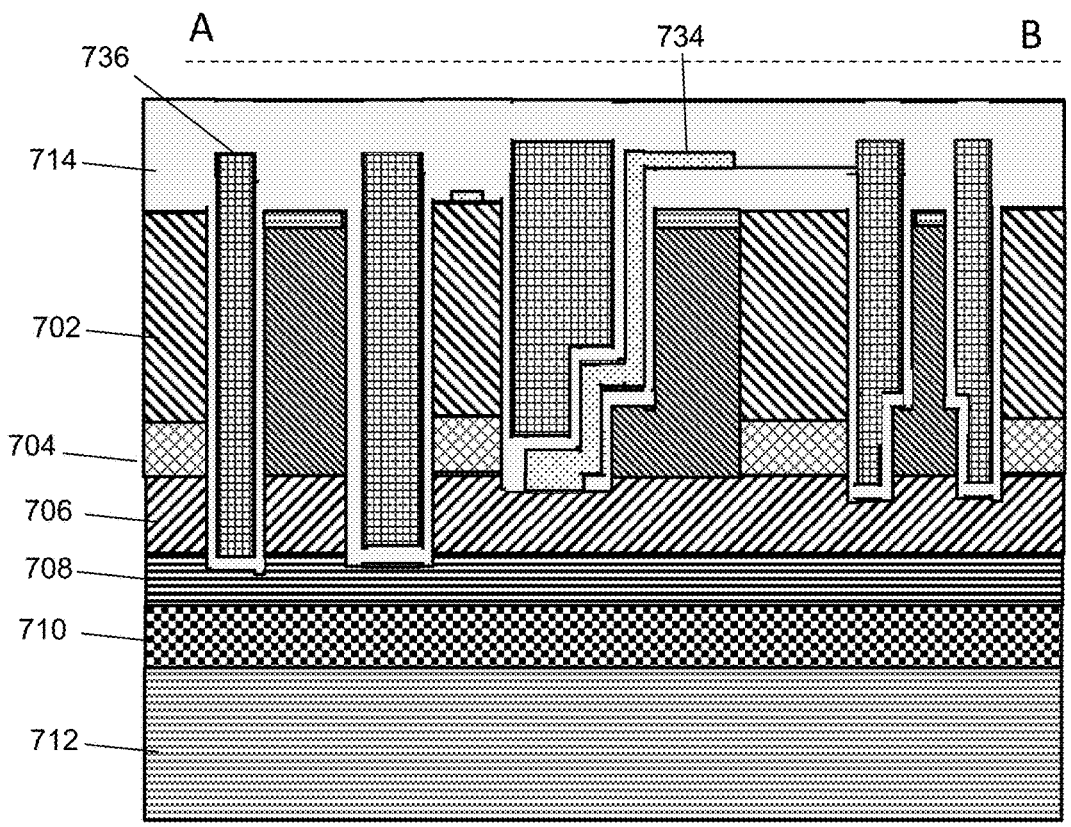
Fig. 13(xii)(A)
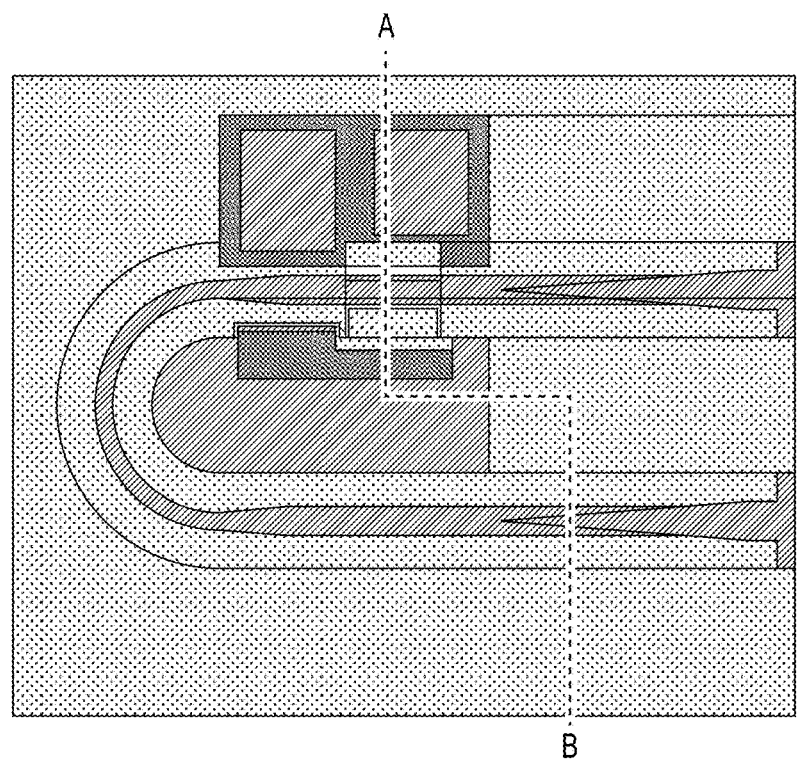
FIG. 13(xii)(B)

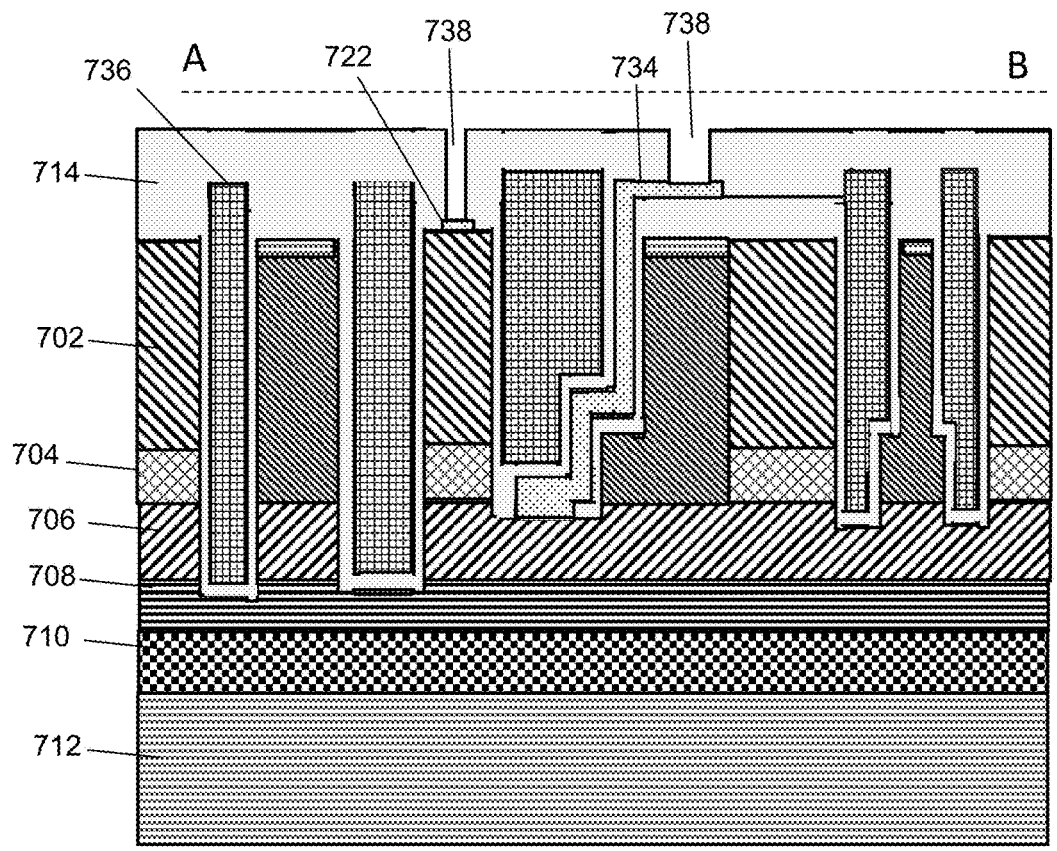
Fig. 13(xiii)(A)
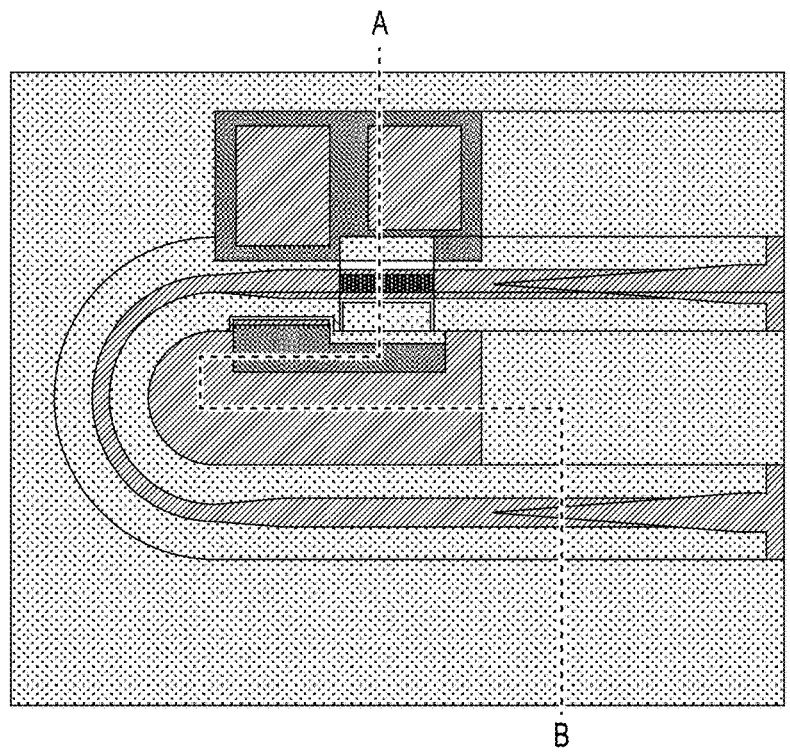
FIG. 13(xiii)(B)

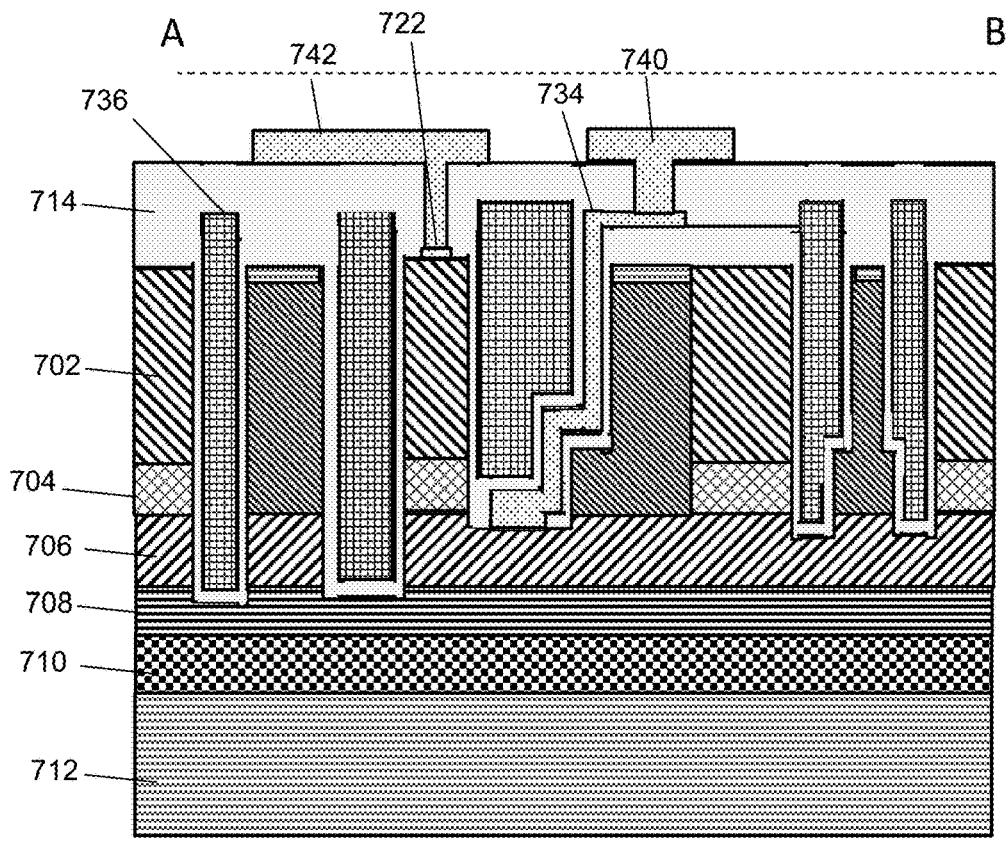
Fig. 13(xiv)(A)
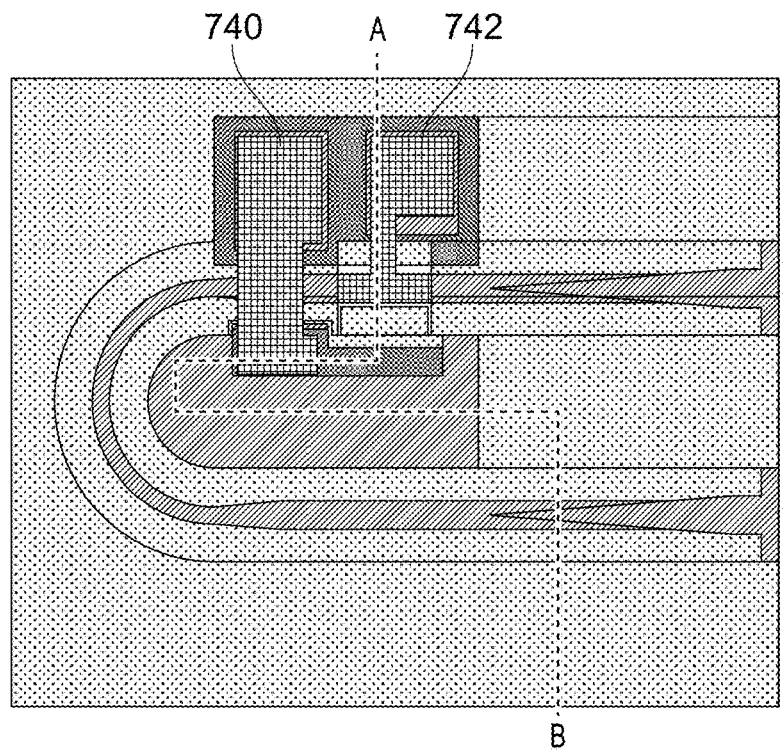
FIG. 13(xiv)(B)

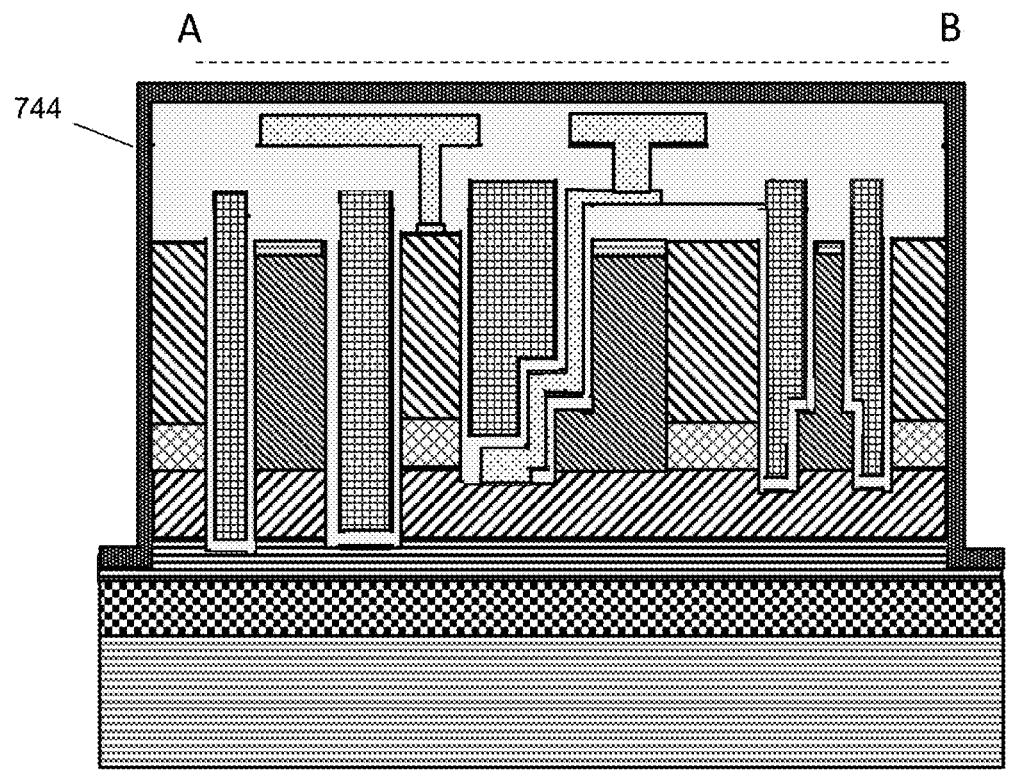
Fig. 13(xvi)(A)
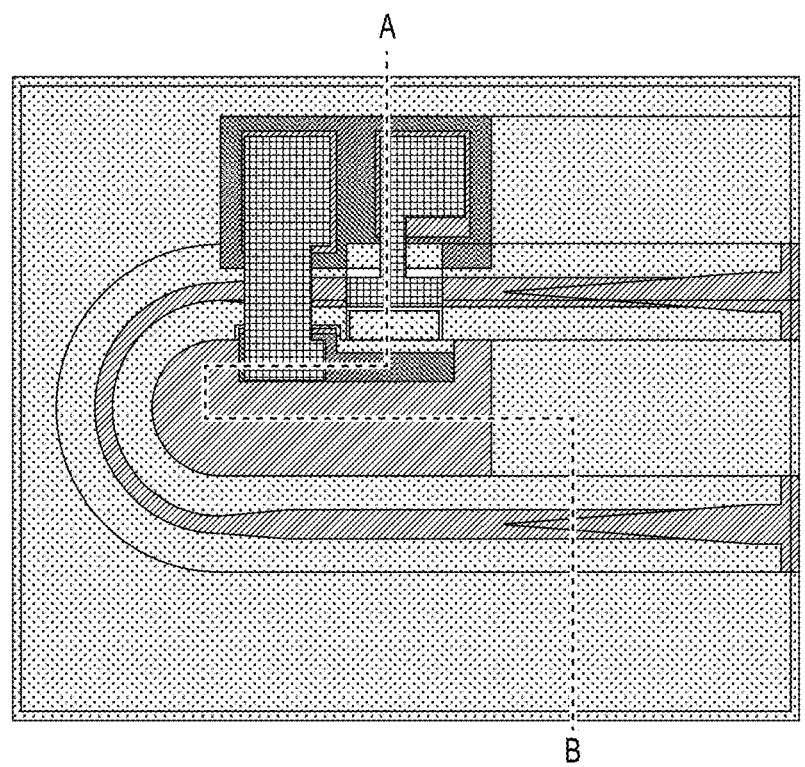
FIG. 13(xvi)(B)

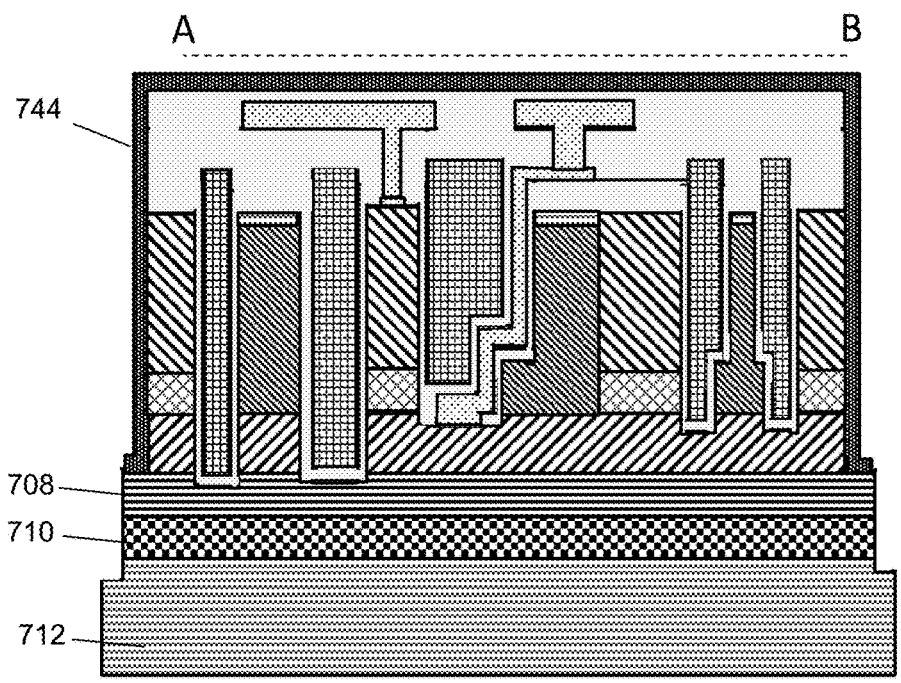
Fig. 13(xvii)(A)
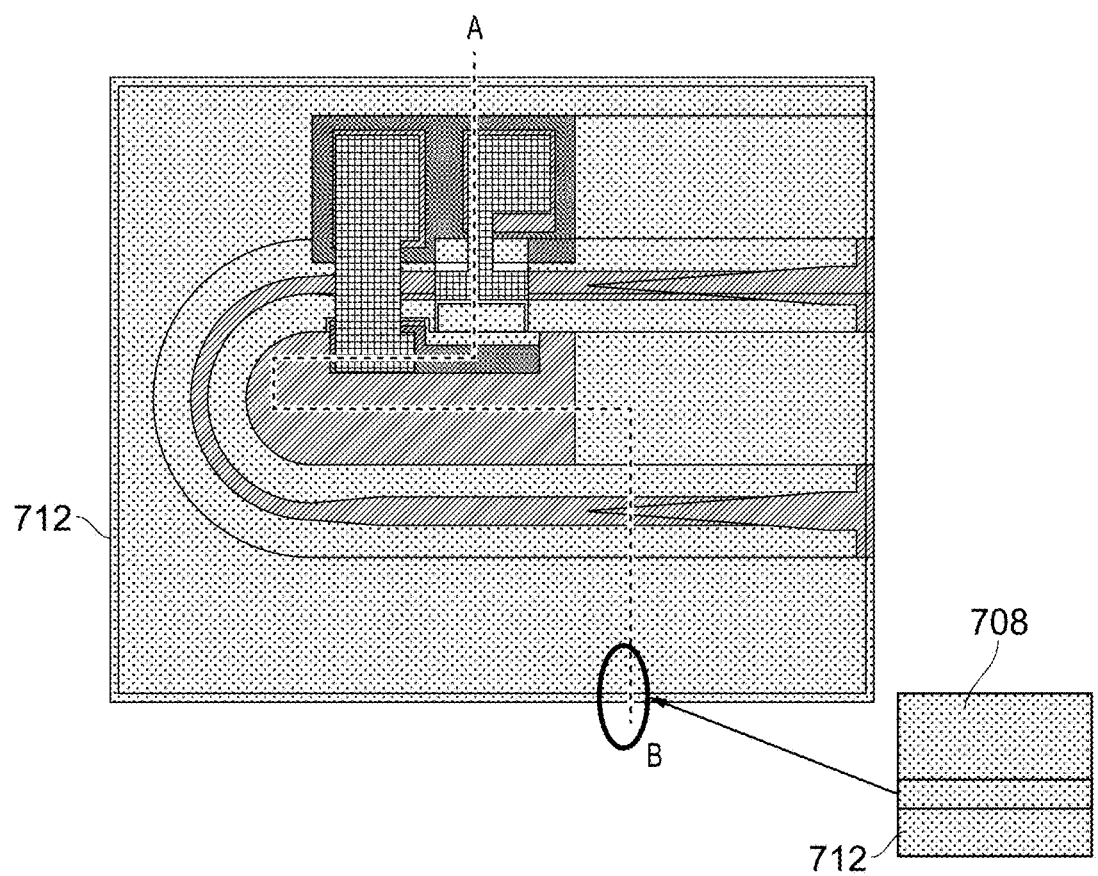
FIG. 13(xvii)(B)

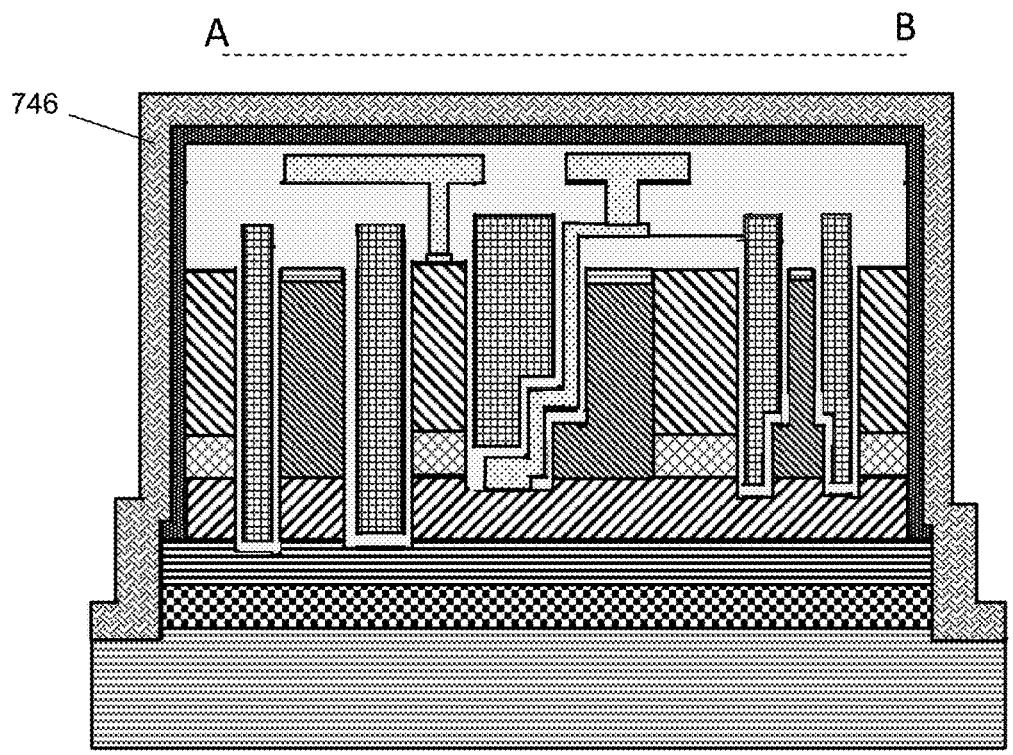
Fig. 13(xviii)(A)
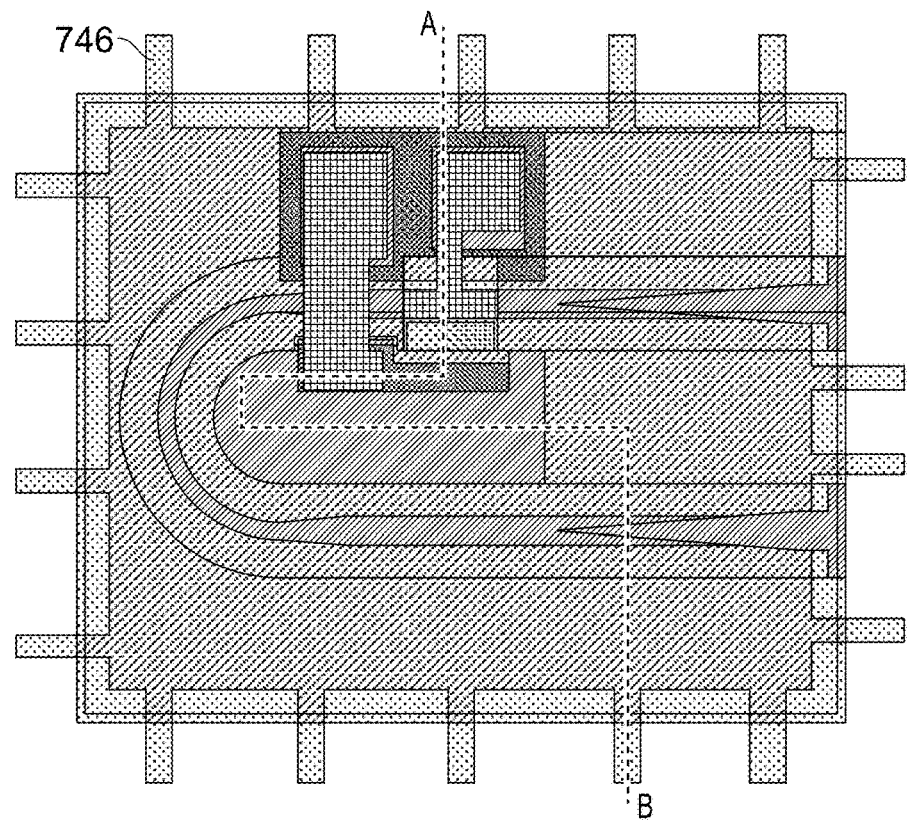
FIG. 13(xviii)(B)

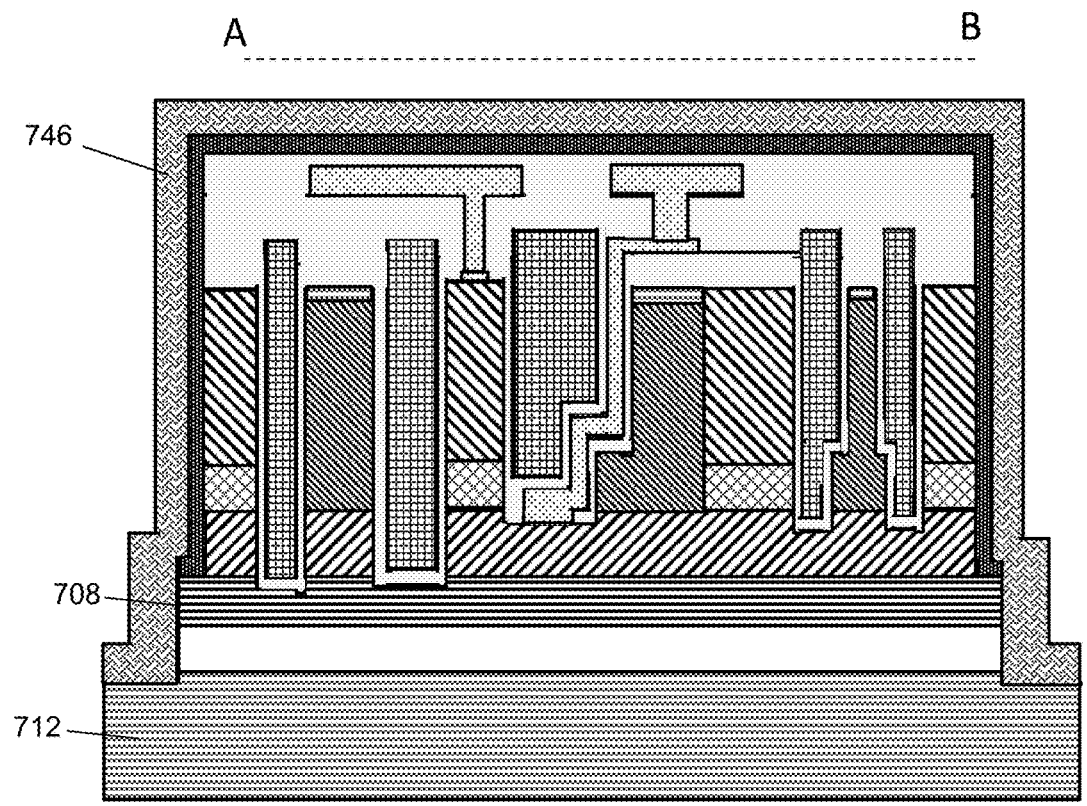
Fig. 13(xix)(A)
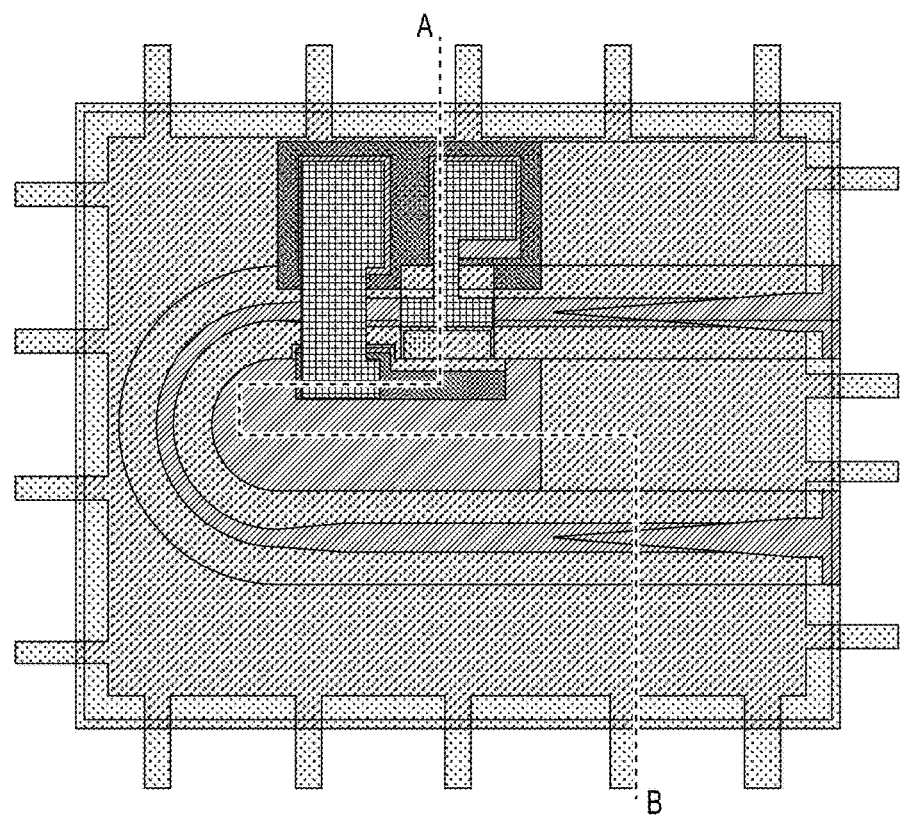
FIG. 13(xix)(B)

HYBRID INTEGRATION PROCESS AND DEVICES

CROSS-REFERENCE TO RELATED APPLICATION(S)

This application claims priority to United Kingdom Patent Application No. 2007016.5, filed in the United Kingdom Intellectual Property Office on May 13, 2020, which is incorporated by reference herein in its entirety.

FIELD OF THE INVENTION

The present invention relates to a device coupon for use in a hybrid integration process with a silicon platform, an optoelectronic device comprising the device coupon, a method of fabricating a device coupon, a method of fabricating an optoelectronic device, and an optoelectronic device fabricating by the method.

BACKGROUND

Hybrid integration of III-V semiconductor based electro-optical devices (e.g. modulators) with silicon platforms (e.g. silicon-on-insulator platforms) by chip bonding confers the advantage of combining the best parts of both materials systems. That is, III-V semiconductor based electro-optical devices are typically faster than silicon based devices, whereas silicon based devices are easier to fabricate and have a higher manufacturing yield.

Previous efforts in hybrid integration have resulted in devices with a very high optical loss, which limits their potential application.

SUMMARY

Accordingly, at a general level, embodiments of the invention provide a device coupon in which a waveguide containing an electro-optical device is separate from one or more passive waveguides.

In a first aspect, embodiments of the invention provide a device coupon for use in a hybrid integration process with a silicon platform, the device coupon comprising:
an input waveguide, including an input facet;
an active waveguide, coupled to the input waveguide, the active waveguide including a III-V semiconductor based electro-optical device; and
an output waveguide, configured to couple light between the active waveguide and an output facet;
wherein the input waveguide and output waveguide are passive waveguides Advantageously, by providing a distinct passive waveguides, which are coupled to the active waveguide, an optoelectronic device fabricated using the device coupon has lower optical losses. Further, embodiments of the invention allow the III-V RF bandwidth and optical coupling loss between the active waveguide and SOI waveguide to be de-coupled. In other words, the III-V RF bandwidth and optical coupling loss between the active waveguide and SOI waveguide can be designed separately so that both RF bandwidth and optical coupling loss can be individually optimised. For example, the optical path length of the active waveguide can be kept to a minimum (i.e. only that necessary for device function) and so the transmission losses can be minimised.

By active waveguide, is meant that the waveguide contains one or more electro-optically active devices. That is, a device which effects light passing through it beyond mere transmission losses. For example, a waveguide which contains a modulator (phase or amplitude), or photodiode would be an active waveguide. In contrast, by passive waveguide it is meant a waveguide which does not contain one or more electro-optically active devices and so only effects light passing through it in a passive manner e.g. through transmission losses. The passive waveguide may be formed from: AlInGaAs, InGaAsP, AlInAs, or another III-V semiconductor material with a refractive index greater than that of InP and with a bandgap which is equally to or exceeds 1.1 eV.

The device coupon may have any one or, to the extent that they are compatible, any combination of the following optional features.

One or both of the input waveguide and output waveguide may contain a bend. By providing a bend in one or both of the input waveguide and output waveguide, optical losses can be minimised as the geometry of the bend can be optimised beyond that possible if the bend were contained within the active waveguide.

In some examples, only one of the input waveguide and output waveguide contains a bend. In such examples where bend may describe a 180° arc, in that light exiting the bend is travelling in a direction antiparallel to light entering the bend.

In some examples, both the input waveguide and output waveguide contains a respective bend. In such examples, each bend may describe a 90° arc. The active waveguide may be located between the two bends, and so light exiting the device coupon may do so in a direction which is antiparallel to light entering the device coupon.

The bend may have a width which is less than that of the active waveguide. Such a bend can further reduce the optical loss as light is transmitted therethrough. In some examples the bend has a width of no more than 1 µm.

One or both of the input waveguide and output waveguide may be formed from a III-V semiconductor.

The active waveguide may be formed from a III-V semiconductor.

One or both of the input waveguide and output waveguide may comprise a mode converter, configured to convert an optical mode of light transmitted therethrough. The optical mode can thereby be optimised to minimise losses through the device.

The III-V semiconductor based electro-optical device may be an electro-absorption modulator. For example, the device may be an amplitude modulator which utilises the Quantum-confined Stark effect or the Franz-Keldysh effect.

The active waveguide may be a straight waveguide having a rectilinear geometry. This can further reduce the optical losses, as straight waveguides are typically less lossy than curved ones.

An optical path length of the active waveguide may be smaller than an optical path length of the input waveguide and/or output waveguide. As the active waveguide typically has higher transmission losses than the passive waveguides, by minimising the optical path length of the active waveguide, transmission losses can be reduced.

The input facet and output facet may be on a same lateral side of the device coupon. Accordingly, waveguides in the silicon platform which connect to and from the device coupon may be spatially adjacent which can reduce over overall footprint of the optoelectronic device.

The device coupon may include an antireflective coating, disposed over one or more lateral sides of the device coupon. This antireflective coating confers two advantages: (i) a reduction in the coupling losses from the silicon platform into the device coupon; and (ii) protection of the device coupon during the hybrid integration process and so a higher device yield.

The device coupon may include a first contact pad and a second contact pad, each contact pad may be electrically connected to a respective layer in the electro-optically active device. By providing the contact pads on the device coupon, further fabrication steps can be avoided.

The input facet and/or output facet may be T-bar facets. T-bar facets have been found to further reduce optical losses when coupling light from waveguides in the silicon platform to the input waveguide and/or output waveguide.

The input waveguide and/or output waveguide may have a width of no more than 4 μm. This dimension has been found to further reduce transmissions losses.

In a second aspect, embodiments of the present invention provide an optoelectronic device comprising a silicon platform and the device coupon of the first aspect, wherein
    the device coupon is bonded to the silicon platform;
    the input waveguide of the device coupon is coupled to an input waveguide of the silicon platform via the input facet; and
    the output waveguide of the device coupon is coupled to an output waveguide of the silicon platform via the output facet.

Such an optoelectronic device has been found to have lower optical losses than those formed from other device coupons.

The device coupon of the second aspect may have any one, or any combination insofar as they are compatible, of the optional features of the first aspect.

In a third aspect, embodiments of the present invention provide a method of fabricating a device coupon for use in a hybrid integration process with a silicon platform, the method comprising the steps of:
    growing a multi-layered III-V semiconductor based stack;
    fabricating an active waveguide, the active waveguide including a III-V semiconductor based electro-optically active device, from the stack;
    fabricating an input waveguide, which is configured to couple light between an input facet and the active waveguide, on the stack; and
    fabricating an output waveguide, which is configured to couple light between the active waveguide and output facet, on the stack;
    wherein the input waveguide and output waveguide are passive waveguides.

Advantageously, by fabricating the passive waveguides separately to the active waveguide, an optoelectronic device fabricated using the device coupon has lower optical losses.

The method may have any one or, to the extent that they are compatible, any combination of the following optional features.

The III-V semiconductor based electro-optical device may comprise a plurality of III-V semiconductor layers. A layer may contain multiple quantum wells.

Fabricating the input waveguide and/or output waveguide may comprise a step of: etching away a portion of the stack and epitaxially growing the input waveguide and/or output waveguide from an exposed surface of the stack.

Fabricating the active waveguide may comprise etching away one or more portions of the stack so as to define the active waveguide.

In a fourth aspect, embodiments of the present invention provide a method of fabricating an optoelectronic device, comprising bonding the device coupon of the first aspect to a silicon platform.

The device coupon of the fourth aspect may have any one, or any combination insofar as they are compatible, of the optional features of the first aspect.

The method may include a flip-chip bonding process.

The method may include a micro-transfer printing process.

In a fifth aspect, embodiments of the present invention provide an optoelectronic device, fabricated by the method of the fourth aspect.

Further aspects of the present invention provide: a computer program comprising code which, when run on a computer, causes the computer to perform the method of the third or fourth aspect; a computer readable medium storing a computer program comprising code which, when run on a computer, causes the computer to perform the method of the third or fourth aspect; and a computer system programmed to perform the method of the third or fourth aspect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
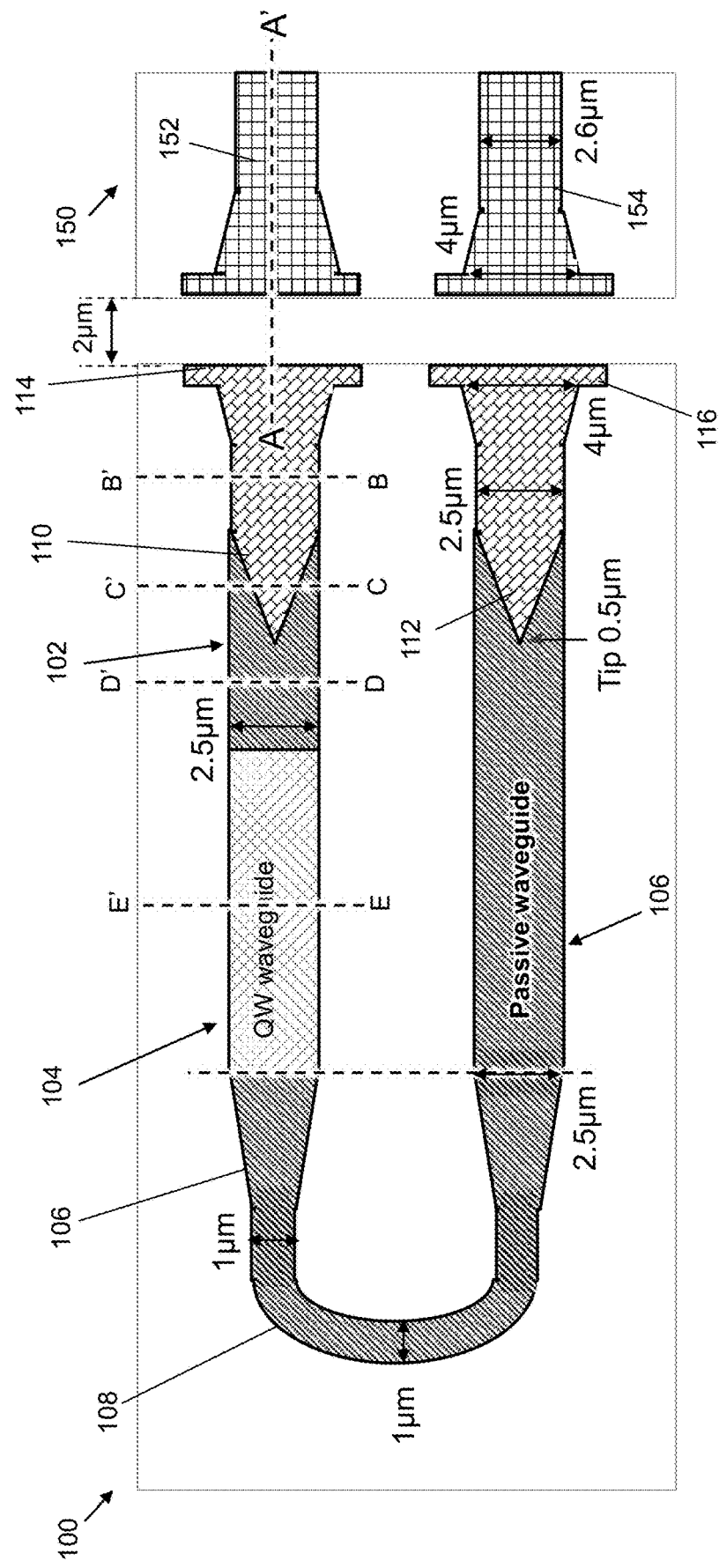
FIG. 1 shows a top down view of a device coupon, used in a micro-transfer printing process, and silicon platform.

Aspects and embodiments of the present invention will now be discussed with reference to the accompanying figures. Further aspects and embodiments will be apparent to those skilled in the art FIG. 1 shows a top down view of a device coupon 100, used in a micro-transfer printing process, and silicon platform 150. The device coupon includes an input waveguide 102, active waveguide 104, and output waveguide 106. The input waveguide and active waveguide are coupled, as are the active waveguide and output waveguide. The output waveguide includes bend 108, so that light enters and exits the device coupon from a same lateral side.

The input waveguide 102 is coupled to an input facet 114, which is present on a lateral side of the coupon 100. The output waveguide 106 is coupled to an output facet 116, which is on the same lateral side as the input facet 114. The input waveguide and output waveguide each comprise respective mode converters 110 and 112. As light, transmitted from input waveguide 152 of the silicon platform 150, passes from the input facet 114 to the input waveguide 102, it is converted to a 2.5 µm optical mode from a 4 µm optical mode (in this example). Similarly, as light passes from the output waveguide 106 to the output facet 116 it is converted from a 2.5 µm optical mode to a 4 µm optical mode for transmission to an output waveguide 154 in the silicon platform 150.

Therefore, in use, light is transmitted from the input waveguide 152 of the silicon platform 150 across a gap of around 2 µm. The light enters the device coupon 100 via input facet 114, and is converted by mode converter 110 contained within the input waveguide 102. The light is then coupled into the active waveguide 104, which contains one or more III-V semiconductor based devices. The now modulated light exits the active waveguide into output waveguide 106. The output waveguide contains a tapered region adjacent to the active waveguide, which tapers in width from 2.5 µm to around 1 µm. The light then enters a bend 108 within the output waveguide, which describes a 180° arc. The output waveguide then runs parallel to the input and output waveguide, and the light enters the output waveguide mode converter 112. The mode converter enlarges the mode of the light, so that it is efficiently coupled from the output facet 116 to the output waveguide 154 of the silicon platform.

Figure 2A:
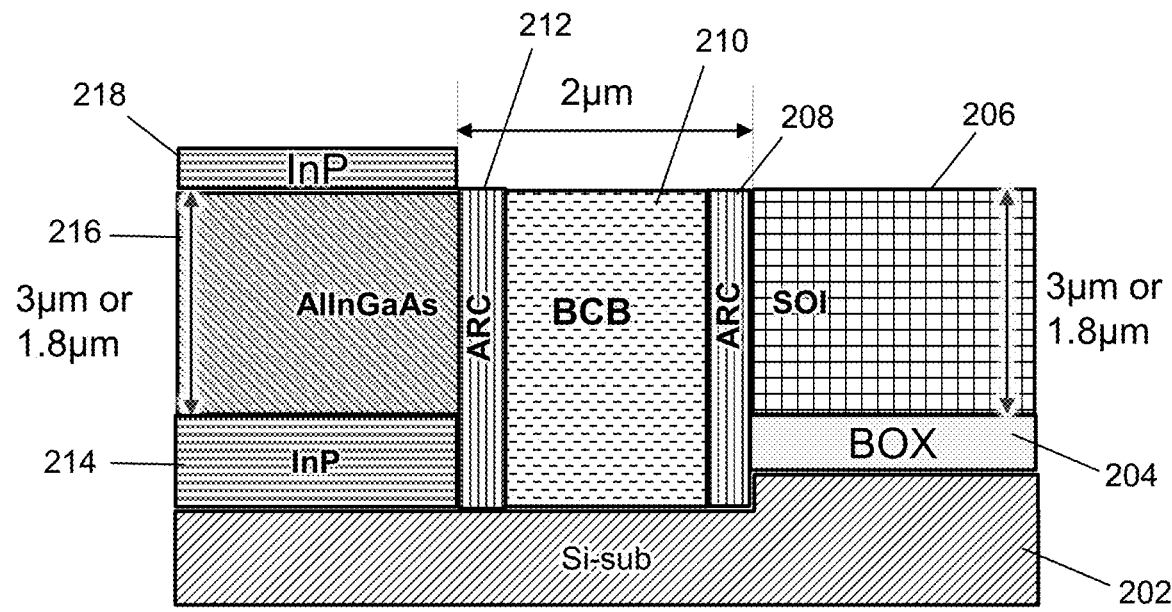
FIGS. 2A-2E are cross-sectional views of the device coupon of FIG. 1 along the lines A-A', B-B', C-C', D-D', and E-E' respectively.

FIGS. 2A-2E are cross-sectional views of the device coupon of FIG. 1 along the lines A-A', B-B', C-C', D-D', and E-E' respectively. As shown in FIG. 2A the silicon platform 150 comprises a silicon substrate 202 (to which the device coupon is bonded). Above the silicon substrate is a buried oxide 204, in some examples SiO$_2$. Above the buried oxide layer is silicon-on-insulator waveguide 206, which may be either 3 µm or 1.8 µm in height. Between the silicon waveguide and the AlInGaAs passive input waveguide 216 are the following layers: a first antireflective coating 208; a Benzocyclobutene fill 210; and a second antireflective coating 212. These layers have a combined depth (i.e. from the SOI waveguide 206 to the AlInGaAs waveguide 216) of around 2 µm. The AlInGaAs waveguide 216 is bounded on a lower surface (i.e. one closest to the silicon substrate 202) by InP bottom cladding layer 214, and on an upper surface by InP upper cladding layer 218. Again, the AlInGaAs waveguide 216 is either 3 µm or 1.8 µm in height.

Figure 2B:
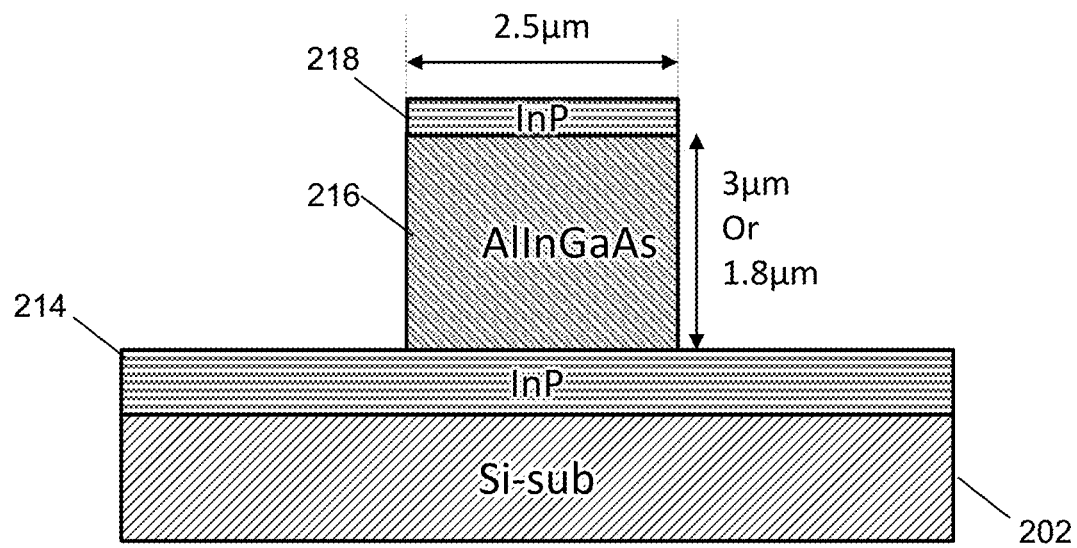
Figure 2C:
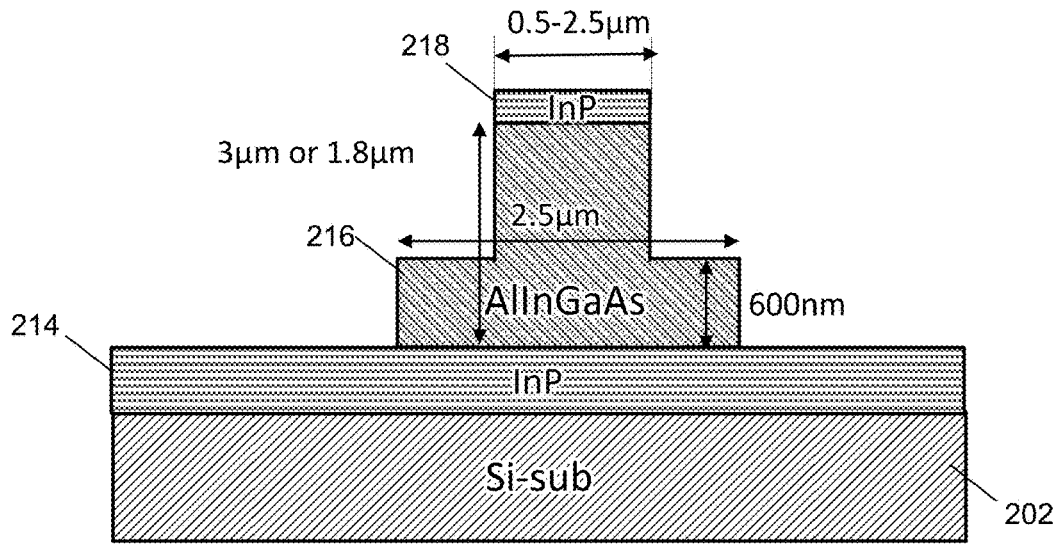
Figure 2D:
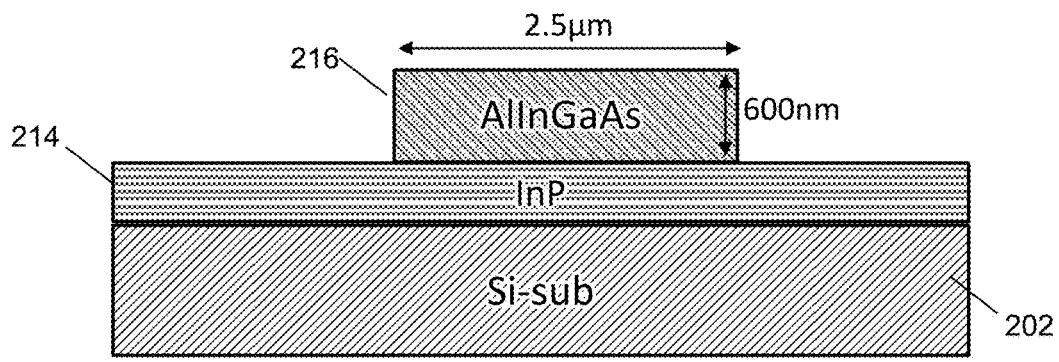

FIG. 2B is a section view along the B-B' line of FIG. 1. The figure shows the passive AlInGaAs waveguide 216 from a front-on view in that light is guided into/out of the plane of the figure. As can be seen, the AlInGaAs waveguide 216 has a width of around 2.5 µm. This is the width of the waveguide after the waveguide lateral taper from 4 µm adjacent to the T-bar input facet. A section view of the mode converter 110 is shown in FIG. 2C, and illustrates the change in width of the waveguide 216 from around 2.5 µm to around 0.5 µm. The mode converter portion of the waveguide is formed of a lower slab region, which is adjacent to the InP layer 214 and has a height of around 600 nm, and an upstanding ridge or rib region, which has a height of around 2.4 µm or 1.2 µm. A region of the input waveguide 216 between the mode converter 110 and the active waveguide 104 is shown in FIG. 2D. As can be seen, at this point along the input waveguide it has a height of around 600 nm, and a width of around 2.5 µm.

Figure 2E:
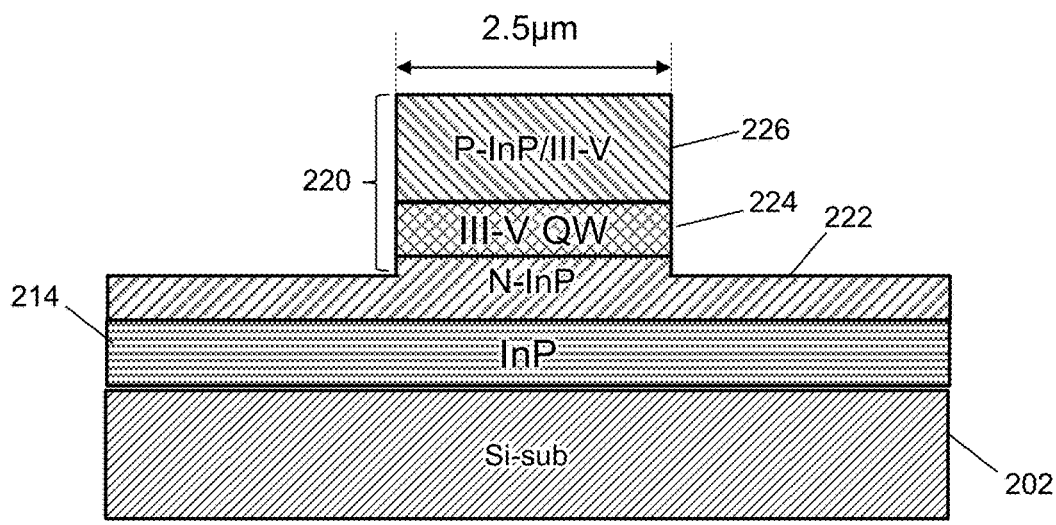

Finally, FIG. 2E shows a cross-section view of the active waveguide 104. The active waveguide includes an electro-optically active device 220, which comprises a plurality of III-V semiconductor based layers. Immediately adjacent to the InP bottom cladding layer 214 is an N-doped InP layer 222. Next, moving away from the InP bottom cladding layer, is a III-V semiconductor quantum well layer 224, and above this is a P-doped InP or other III-V semiconductor based layer 226. Again, the active waveguide has a width of around 2.5 µm.

It should be noted that whilst FIGS. 2A, 2B, 2C, and 2D are section views through the input waveguides (SOI and device coupon) these section views are effectively mirrored in the output waveguides (SOI and device coupon).

Figure 3:
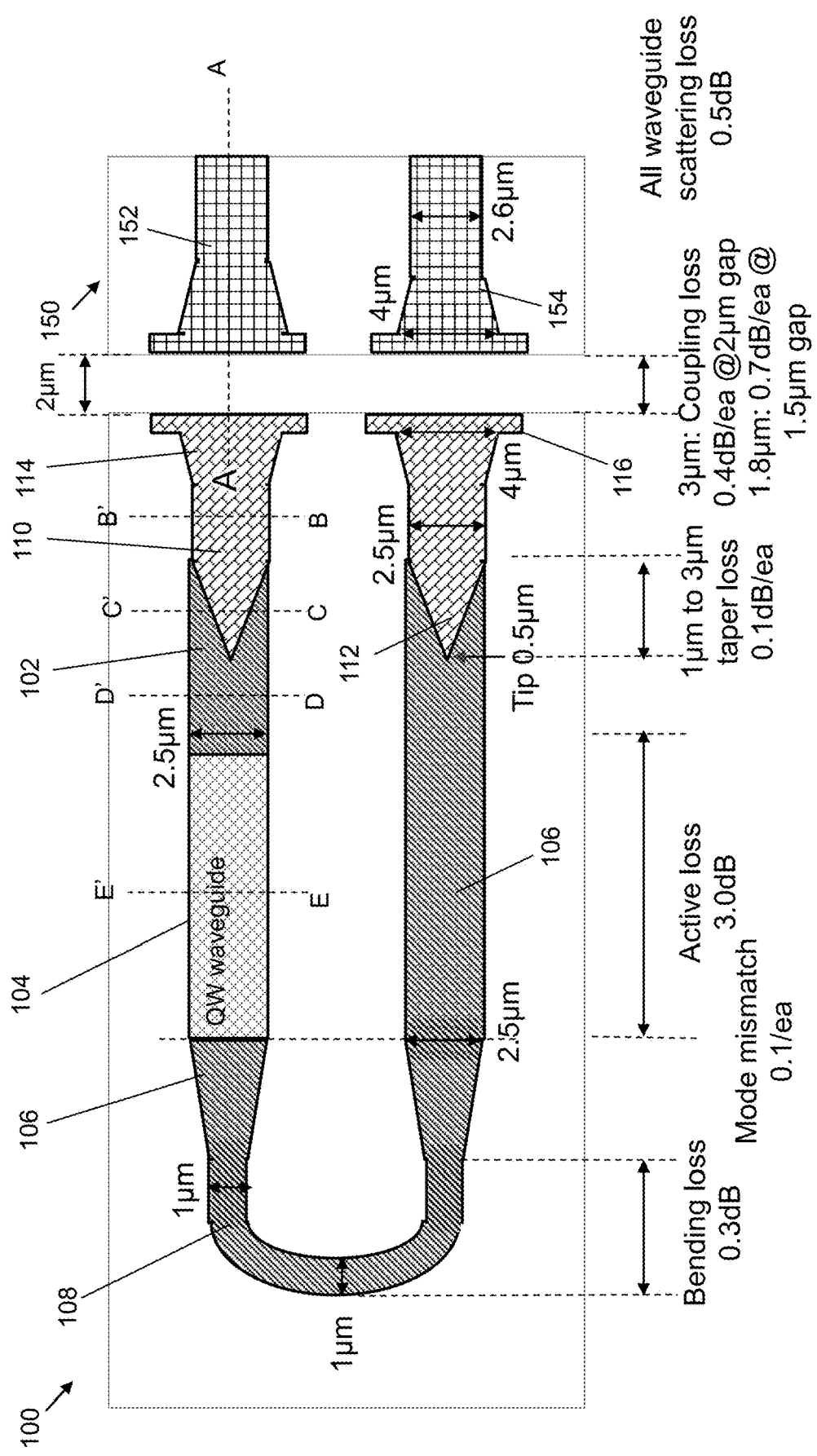
FIG. 3 shows a top-down view of the device coupon of FIG. 1 with etched facets, after use in a flip-chip process.

FIG. 3 shows a top-down view of the device coupon of FIG. 1 with etched facets, after use in a flip-chip process. In this figure the losses associated with various regions of the device coupon are identified. For a 3 µm waveguide system (i.e. one in which the SOI waveguides, and passive waveguides 102, 106 adjacent to the facets 114, 116 are 3 µm in height), the coupling loss across the 2 µm gap between the SOI chip and device coupon is around 0.4 dB each way. For a 1.8 µm waveguide system, the gap can be reduced to around 1.5 µm, and the loss would be around 0.7 dB each way. Each mode coupler 110, 112 incurs a further 0.1 dB each, and the active waveguide incurs a 3.0 dB loss. The bending losses are around 0.3 dB, and various mode mismatches incur a further 0.1 dB for each of the input and output waveguides. The total loss due to scattering in the various waveguides amounts to 0.5 dB.

Therefore, for a 3 µm waveguide system, the total loss of light passing from the SOI chip, through the device coupon, and back, amounts to: (0.1 dB×2)+0.3 dB+3.0 dB+(0.1 dB×2)+(0.4 dB×2)+0.5 dB=5.0 dB. Similarly, for a 1.8 µm waveguide system, the total loss of light passing from the SOI chip, through the device coupon, and back, amounts to: (0.1 dB×2)+0.3 dB+3.0 dB+(0.1 dB×2)+(0.7 dB×2)+0.5 dB=5.6 dB.

Figure 4:
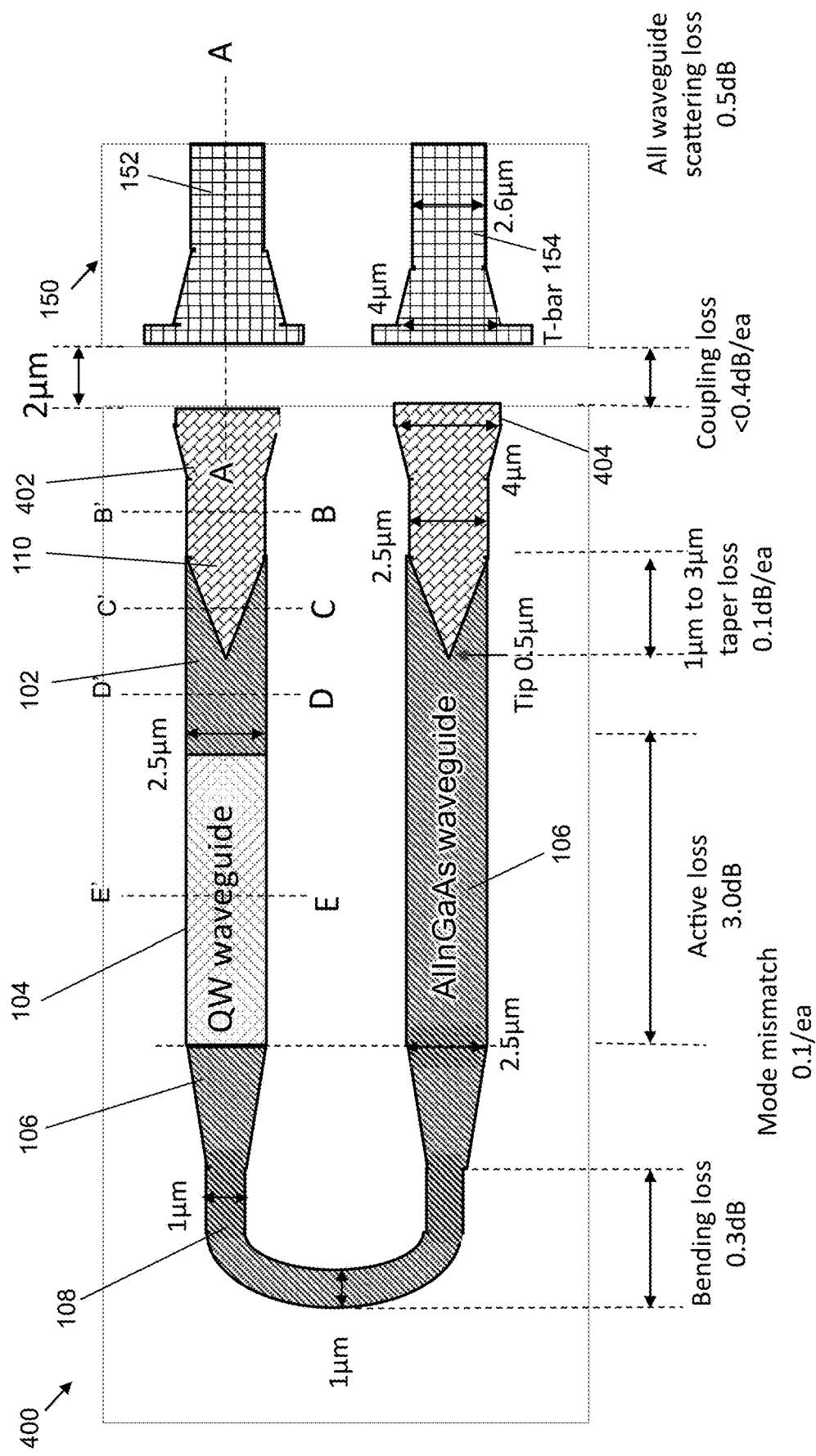
FIG. 4 shows a top-down view of a variant device coupon with cleaved facets, after use in a flip-chip process.

FIG. 4 shows a top-down view of a variant device coupon 400 with cleaved facets, used in a flip-chip process. Where the variant device coupon 400 shares features with the coupon 100 shown in FIGS. 1 and 3, like features are indicated by like reference numerals. Chiefly, the coupon 400 differs from that shown previously in that its input 402 and output 404 facet are cleaved rather than etched. Correspondingly, the coupling loss from the SOI chip to and from the device coupon is reduced to less than 0.4 dB each way.

Figure 5A:
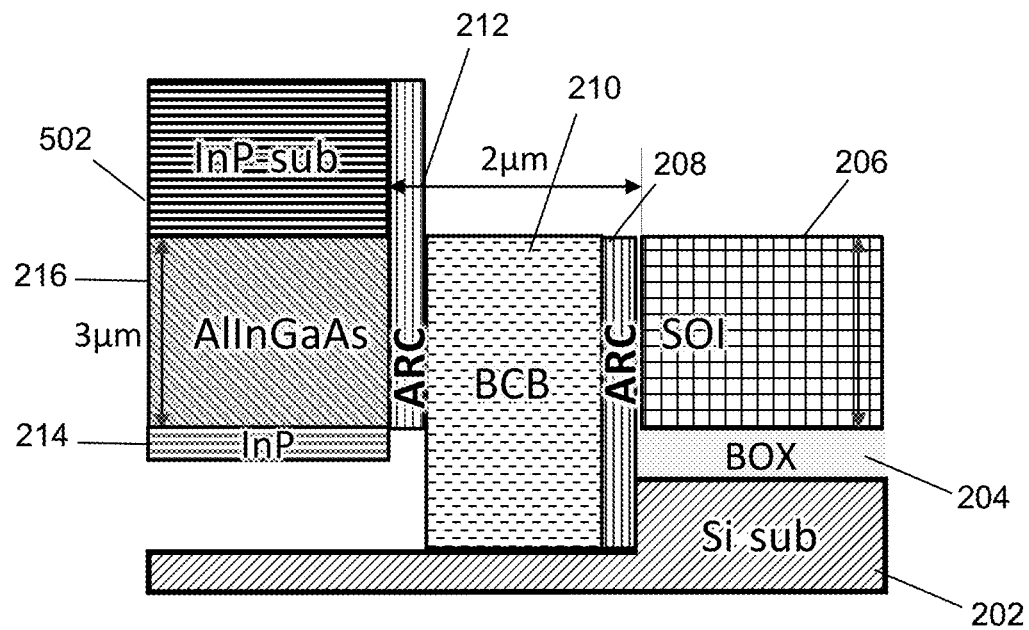
FIGS. 5A-5E are cross-sectional views of the device coupons of FIGS. 3 and 4 along the lines A-A', B-B', C-C', D-D', and E-E' respectively.

FIGS. 5A-5E are cross-sectional views of the device coupons of FIGS. 3 and 4 along the lines A-A', B-B', C-C', D-D', and E-E' respectively. As shown in FIG. 5A, AlInGaAs waveguide 216 in the flip-chip bonded device coupon is aligned with the SOI waveguide 206. However, in contrast to the device shown previously, the waveguide 216 is bounded on an upper side by InP substrate 502. As the device coupon has been flipped prior to bonding, the substrate (which was previously on the bottom of the device coupon) is now the uppermost layer. Similarly, the elements shown in FIGS. 5B to 5E are rotated 180° relative to the same elements shown in FIGS. 2B-2E. So, for example, the mode converter has a 600 nm slab portion which is above (i.e. further from the substrate than) the ridge or rib portion. Similarly the electro-optically active device has a lower P-doped InP/III-V layer 224 and an upper N-doped InP layer 222. As will be appreciated, various support structures and metal bonding structures have been omitted from FIGS. 5A-5E for clarity.

Figure 5B:
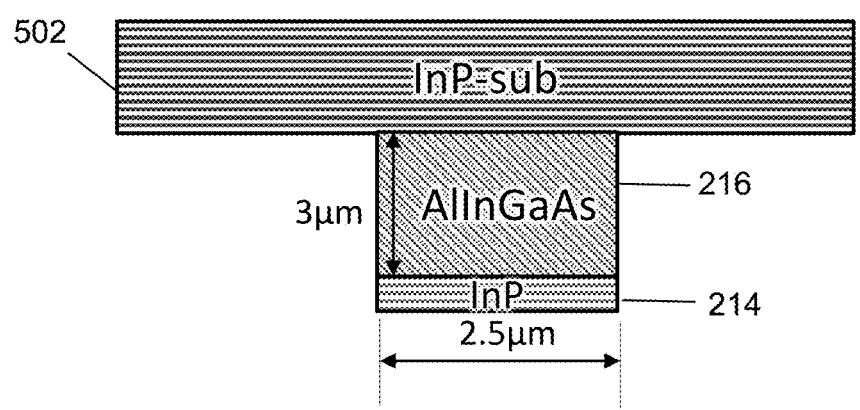
Figure 5C:
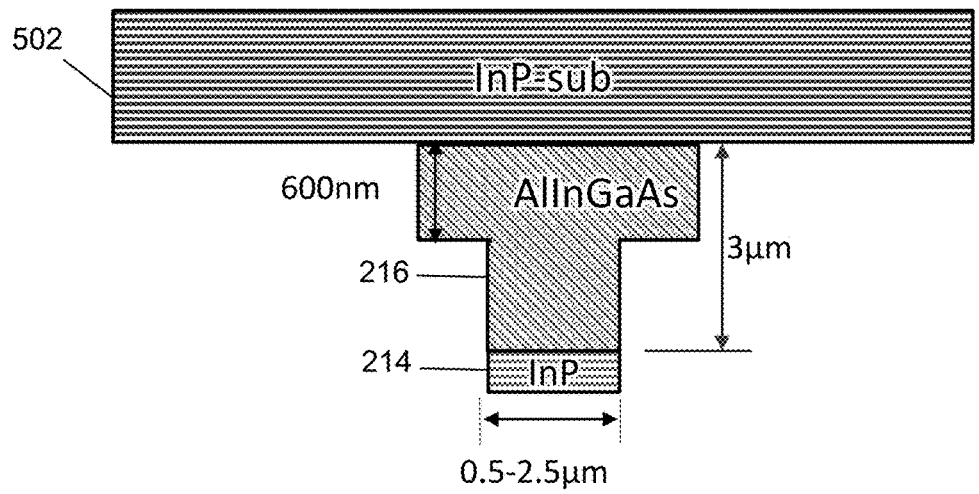
Figure 5D:
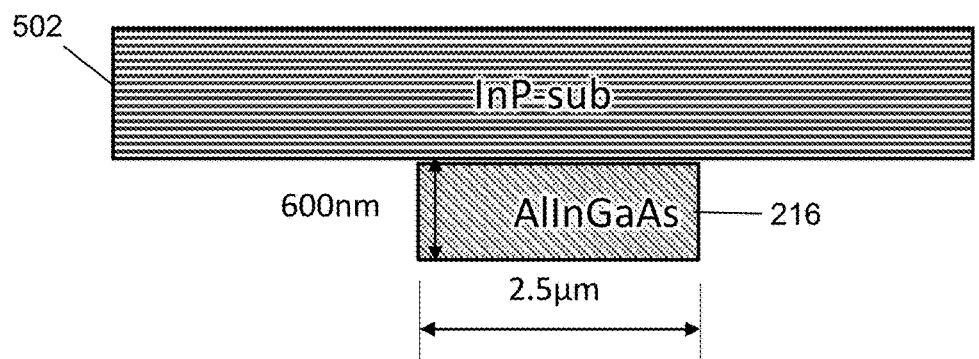
Figure 5E:
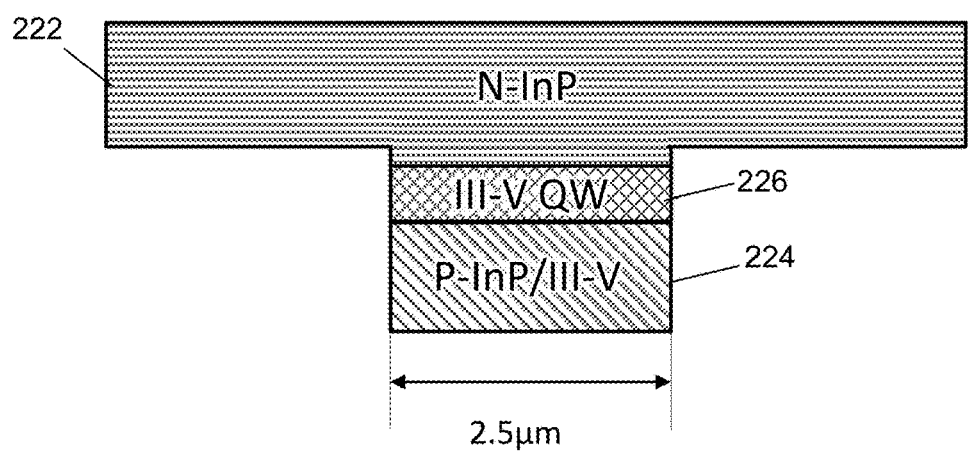

Again, it should be noted that whilst FIGS. 5A-5C are cross-sections through the input waveguide 102, these section views are effectively mirrored in the output waveguide 106.

Figure 6A:
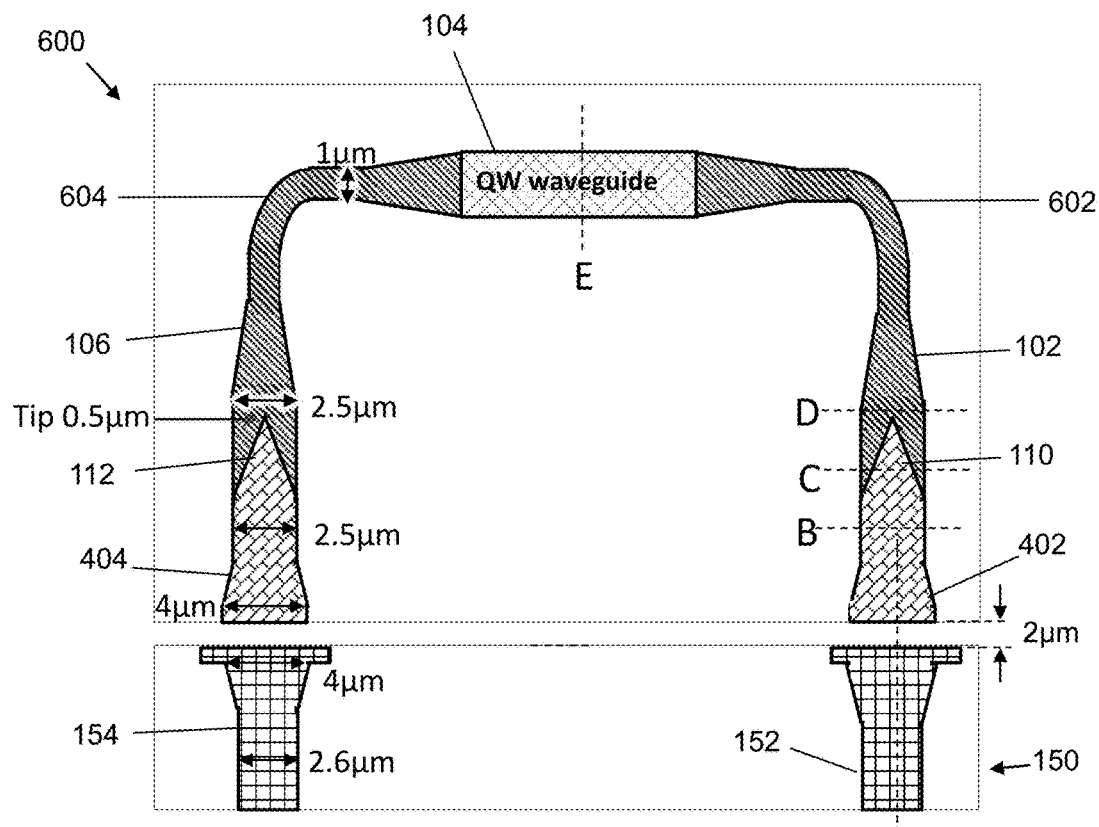
FIGS. 6A and 6B respectively show variant device coupons.
Figure 6B:
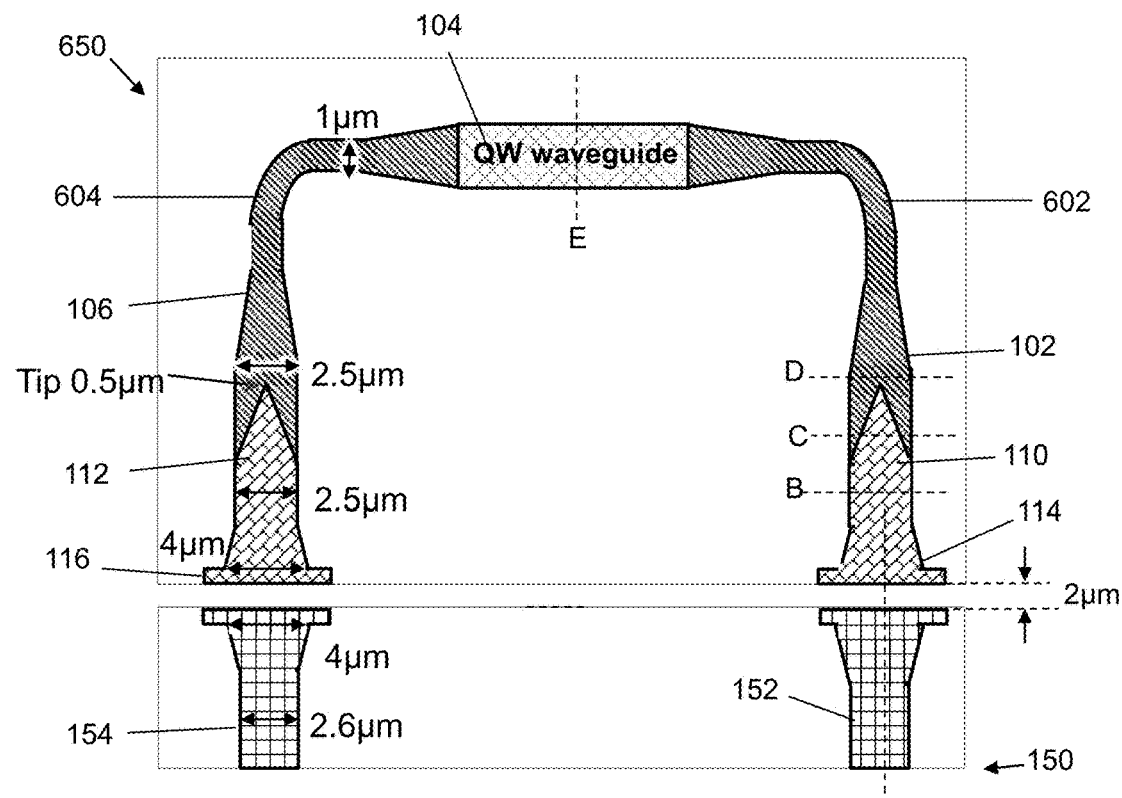

FIGS. 6A and 6B respectively show variant device coupons 600 and 650. Where these coupons share features with those shown previously, like features are indicated by like reference numerals. Chiefly, the two device coupons 600 and 650 differ from those shown previously in that each of the input waveguide 102 and output waveguide 106 has a respective bend. The input waveguide 102 has an input waveguide bend 602, which describes a 90° arc. It is coupled to the active waveguide 104 which now extends perpendicularly to the input and output facets, in contrast to the coupons shown in FIGS. 1, 3, and 4. The output waveguide 106 also contains an output waveguide bend 604 which also describes a 90° arc. As before then, light enters and exits the device through the same lateral side of the device coupon. The coupon 600 shown in FIG. 6A differs from coupon 650 shown in FIG. 6B, in that the input and output facets 402 and 404 are cleaved facets rather than etched facets 114 and 116.

Figure 7:
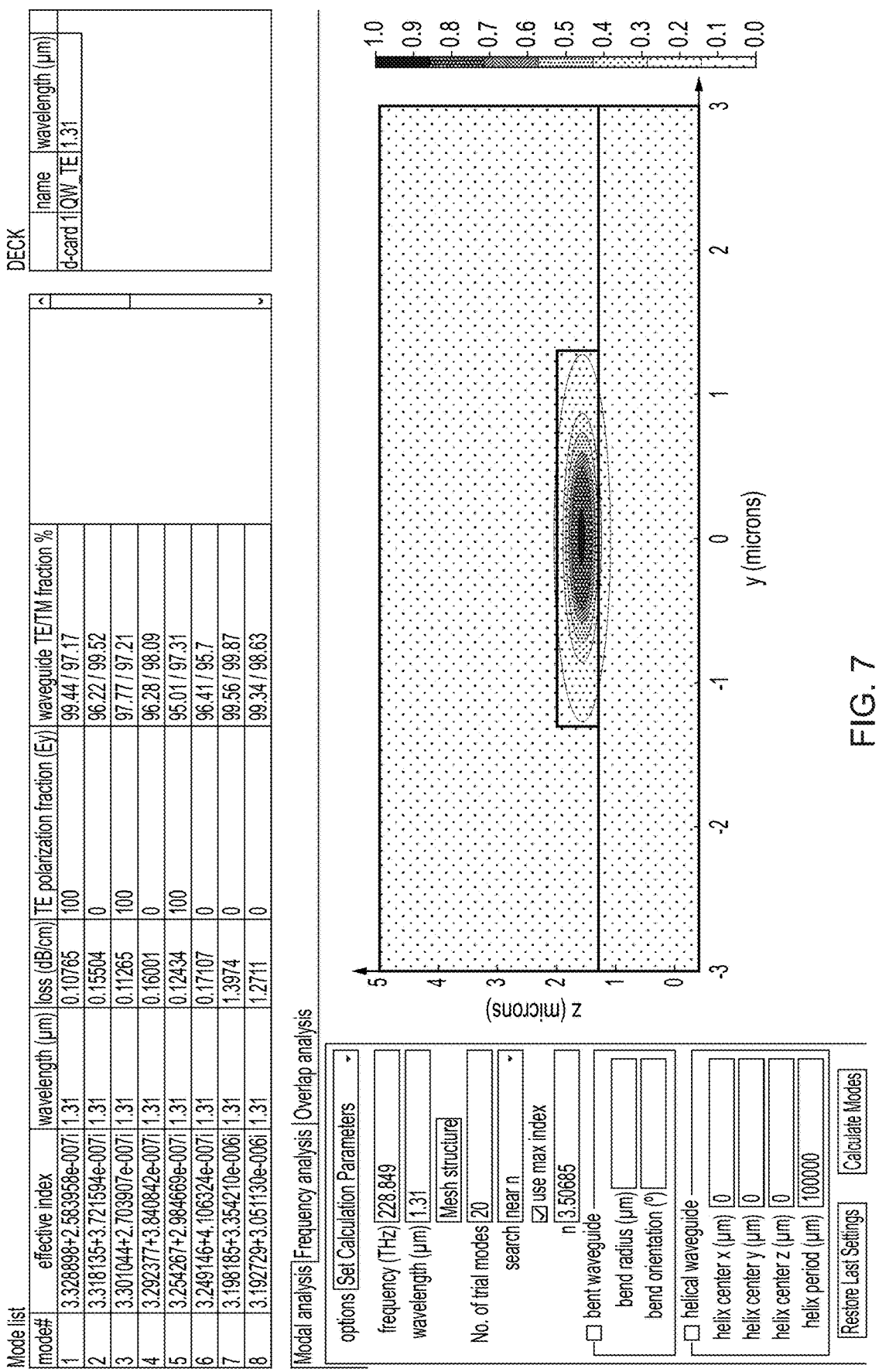
FIG. 7 shows the results of a simulation of an input waveguide of a device coupon.
Figure 8:
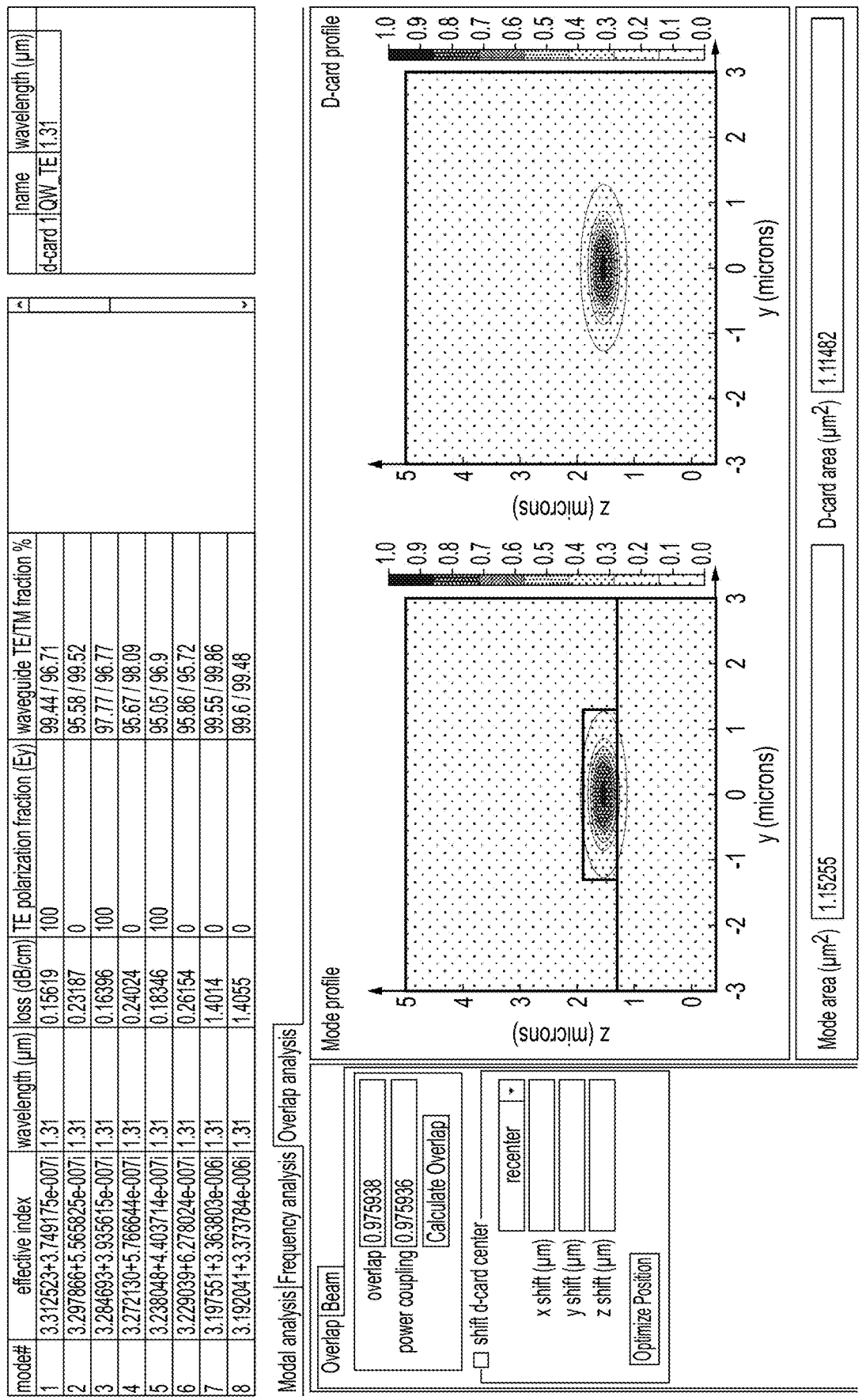
FIG. 8 shows the results of a simulation of an input waveguide of a device coupon.
Figure 9:
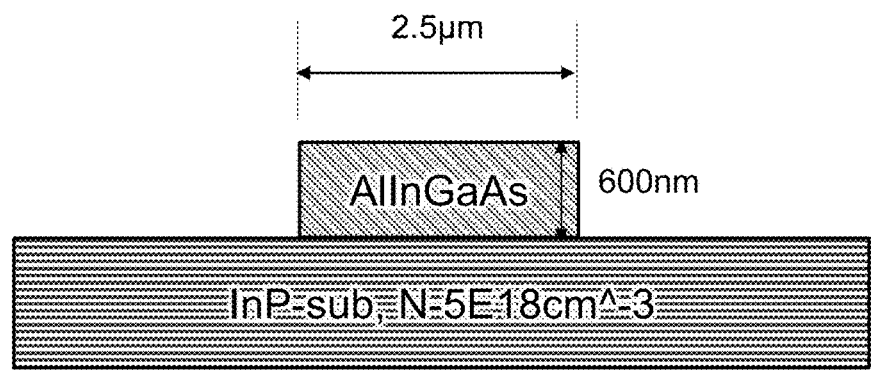
FIG. 9 shows a schematic cross-section of the simulated input waveguide.

FIG. 7 shows the simulated optical transverse electric (TE) mode of the AlInGaAs passive waveguide, having a 600 nm height and 2.5 um width. FIG. 8 shows the simulated TE optical mode coupling efficiency between the AlInGaAs passive waveguide mode (left with frame) and the QW active waveguide mode (right without frame). As is discussed in more detail below, the input waveguide was formed by regrowing an AlInGaAs layer with a bandgap wavelength of around 1127 nm (the same as the barrier layer of the multiple quantum well layer). As shown in FIG. 9, which is a schematic cross-section of the simulated input waveguide, the passive AlInGaAs waveguide had a height of at least 600 nm and no more than 3 μm and a width of around 2.5 μm. The simulation was performed with an assumed doping concentration in the InP substrate of $5 \times 10^{18}$ cm$^{-3}$. The fundamental transverse electrical mode's propagation loss was found to be 0.11 dB/cm, and the mode coupling efficiency to the active waveguide was found to be 0.9759 (corresponding to around 0.1 dB of loss). Therefore, for a 600 nm tall passive waveguide, the mode mismatch losses from the passive waveguide to the active waveguide was found to be 0.1 dB.

Figure 10:
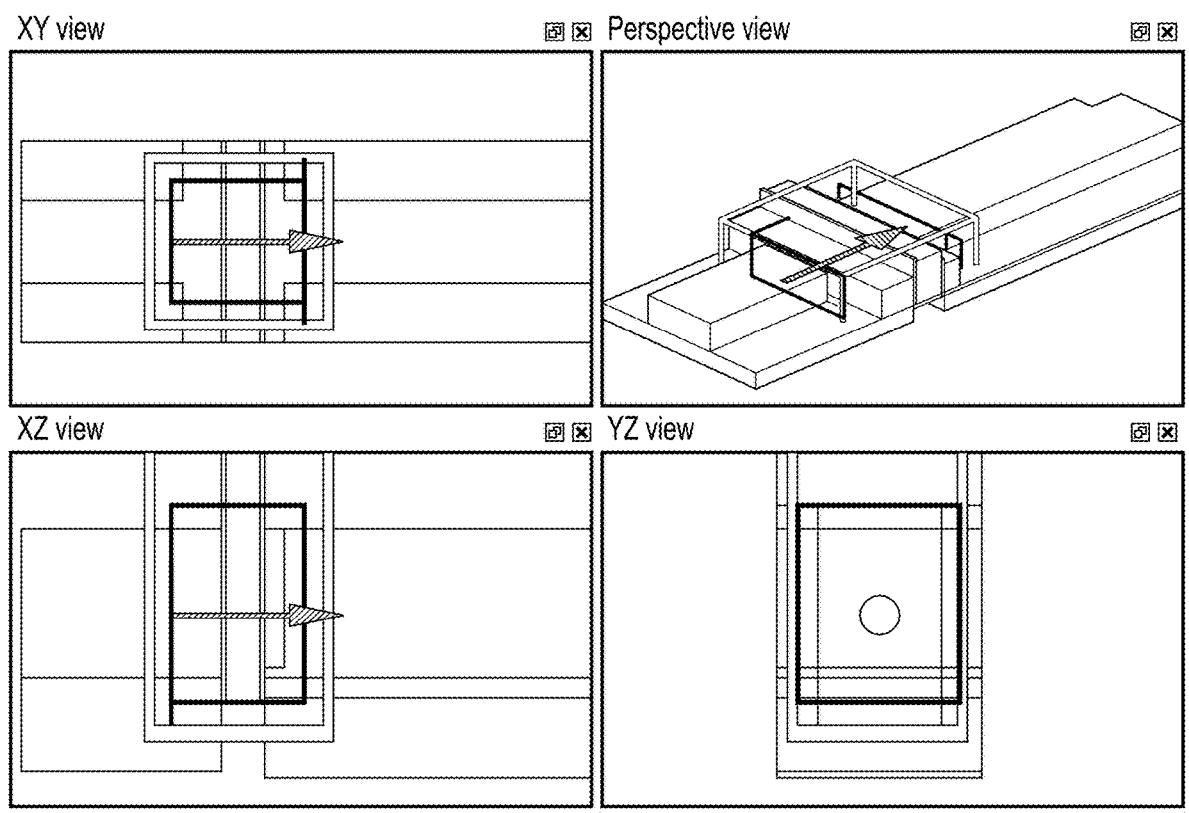
FIG. 10 shows a simulated output waveguide connected to a silicon waveguide in the silicon platform.
Figure 11:
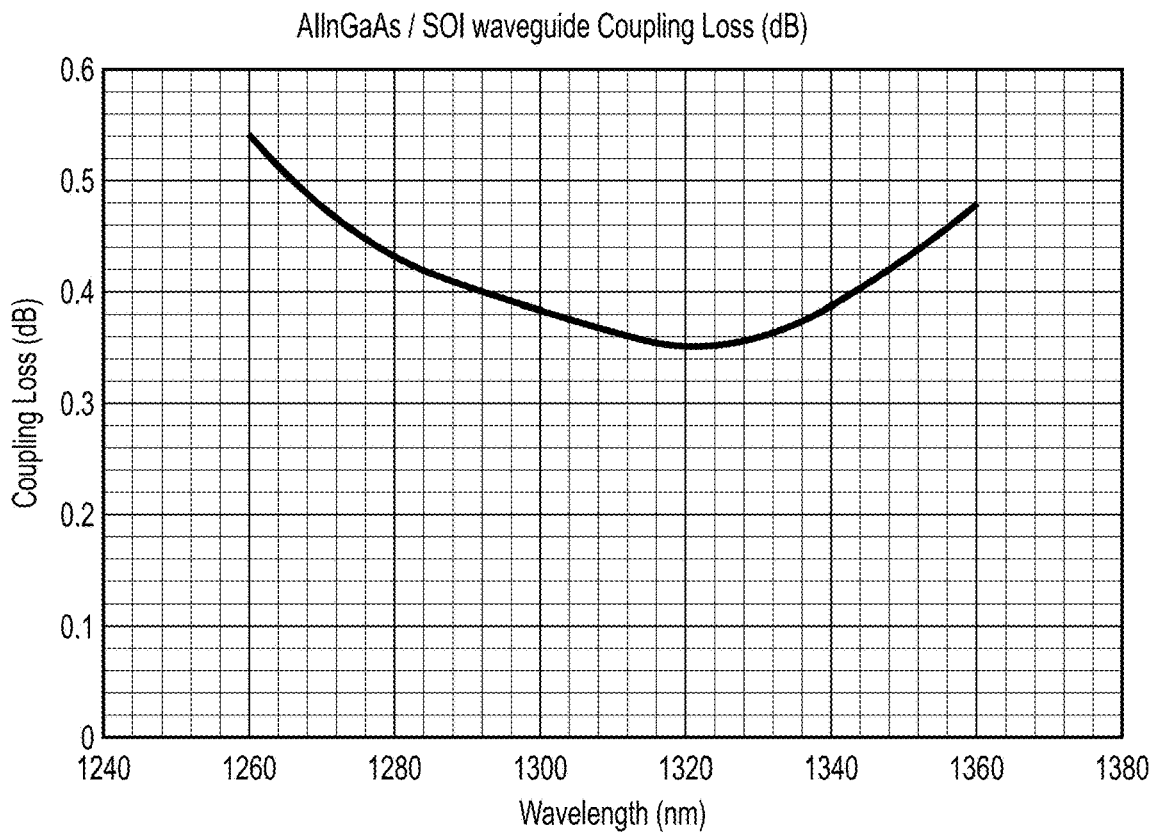
FIG. 11 is a plot showing coupling loss as a function of wavelength when the output waveguide and silicon waveguide have a height of 3 μm.

FIG. 10 shows a FDTD simulation model for an output waveguide connected to a silicon waveguide in the silicon platform. The gap between the input facet of the device coupon and the corresponding face in the silicon platform was taken to be 2.0 μm. The SOI waveguide was simulated as having the following dimension: 3 μm in height; 4 μm in width; and a 1 μm wide T-bar. The AlInGaAs passive waveguide was simulated as having the following dimensions: 3 μm in height; 4 μm in width; and 2 μm wide T-bar. The antireflective coatings were simulated as a $Si_3N_4$ layer with an optical depth (i.e. thickness) of around 180 nm. As shown in FIG. 11, which is a plot showing coupling loss as a function of wavelength, the coupling loss at a wavelength of 1310 nm was found to be less than 0.4 dB.

Figure 12:
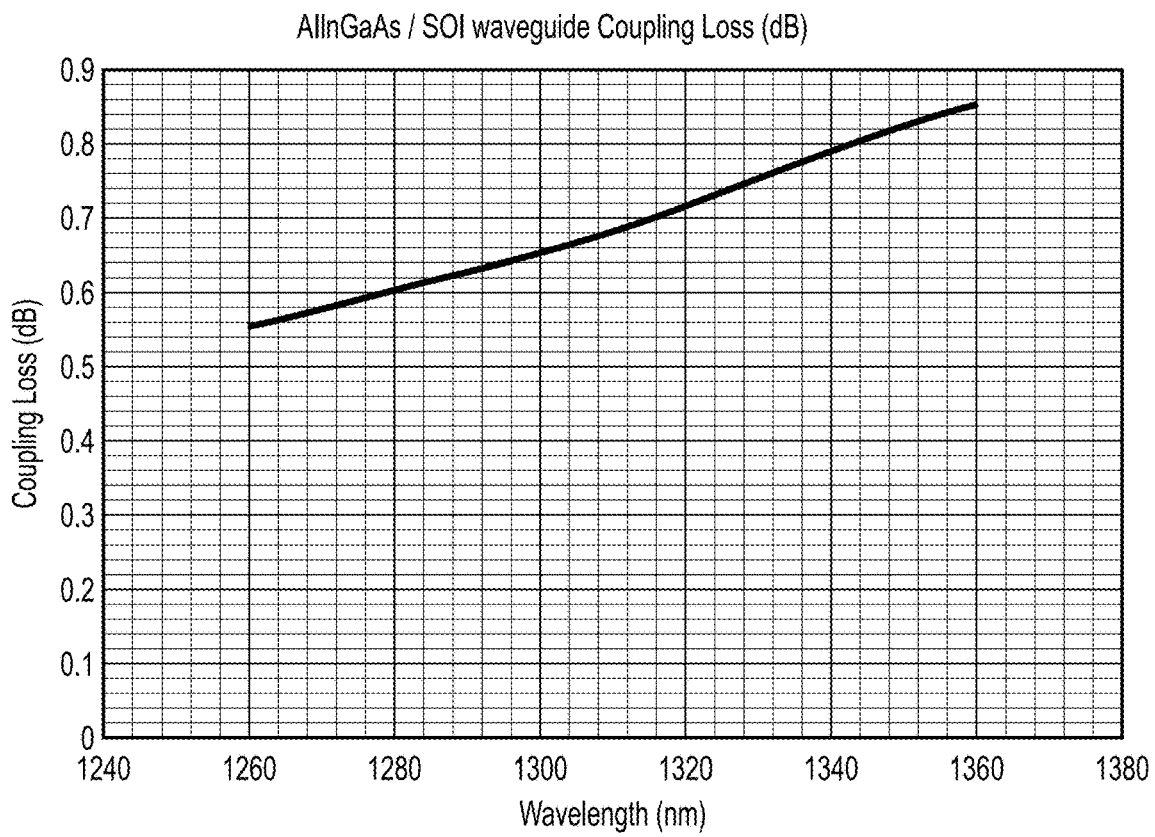
FIG. 12 is a plot showing coupling loss as a function of wavelength when the output waveguide and silicon waveguide have a height of 1.8 μm.

FIG. 12 is a plot showing coupling loss as a function of wavelength when the output waveguide and silicon waveguide have a height of 1.8 μm and the gap between the facets was 1.5 μm. Asides from that all other dimensions were identical to the device shown in FIG. 10. As shown in this plot, the coupling loss was found to be less than 0.7 dB at a wavelength of 1310 nm.

The electro-optically active device illustrated so far has comprised three layers: a P-doped layer; a multiple-quantum well layer; and an N-doped layer. However, the devices shown herein may have any of the compositions shown in the following tables:

TABLE 1

| Layer | Multiplier | Material | Composition | Wavelength (nm) | Thickness (nm) | Doping (cm$^{-3}$) |
| --- | --- | --- | --- | --- | --- | --- |
| 19 | | InGaAs | Lattice match to InP | | 120 + 30 | $1 \times 10^{19}$ CBr + Zn |
| 18 | | InGaAsP | | 1100 | 50 | $1.5 \times 10^{18}$ Zn |
| 17 | | InP | — | — | 2340 ( or 1340) | $1 \times 10^{18}$ Zn |
| 16 | | InGaAsP | | 1100 | 20 | $1 \times 10^{18}$ Zn |
| 15 | | AlInAs | | | 60 | $1 \times 10^{17}$ to $1 \times 10^{18}$ Zn |
| 14 | | AlInAs | | 843 | 60 | $1 \times 10^{17}$ Zn |
| 13 | | AlInGaAs | | 968 | 70 | |
| 12 | 12× | AlInGaAs | | 1127 | 7 | |
| 11 | 12× | AlInGaAs | | 1245 | 9 | |
| 10 | | AlInGaAs | | 1127 | 7 | |
| 9 | | InGaAsP | | 1100 | 117 | |
| 8 | | InP | — | — | 80 | $2 \times 10^{17}$ Si |
| 7 | | InP | — | — | 70 | $5 \times 10^{17}$ Si |
| 6 | | InP | — | — | 920 | $8 \times 10^{17}$ Si |
| 5 | | InGaAsP | Lattice match to InP | 1100 | 20 | Undoped |
| 4 | | InP | | | 800 | Undoped |
| 3 | | InGaAs | | | 50 | Undoped |
| 2 | Release | AlInAs | | | 500 | Undoped |
| 1 | Buffer | InP | | | 50 | Undoped |
| 0 | | | | InP Substrate | | |

TABLE 2

| Layer | Multiplier | Material | Composition | Wavelength (nm) | Thickness (nm) | Doping (cm$^{-3}$) |
|---|---|---|---|---|---|---|
| 12 | | InGaAs | Lattice match to InP | | 120 + 30 | $1 \times 10^{19}$ CBr + Zn |
| 11 | | InGaAsP | | 1100 | 50 | $1.5 \times 10^{18}$ Zn |
| 10 | | InP | | | 2340 (or 1340) | $1 \times 10^{18}$ Zn |
| 9 | | AlInGaAs | | 1280 | 340 | |
| 8 | | InP | | | 80 | $2 \times 10^{17}$ Si |
| 7 | | InP | | | 70 | $5 \times 10^{17}$ Si |
| 6 | | InP | | | 920 | $8 \times 10^{17}$ Si |
| 5 | | InGaAs | | | 50 | Undoped |
| 4 | | InGaAsP | Lattice match to InP | 1100 | 20 | Undoped |
| 3 | | InP | | | 800 | Undoped |
| 2 | Release | AlInAs | | | 500 | Undoped |
| 1 | Buffer | InP | | | 50 | Undoped |
| 0 | | InP Substrate | | | | |

TABLE 3

| Layer | Multiplier | Material | Composition | Wavelength (nm) | Thickness (nm) | Doping (cm$^{-3}$) |
|---|---|---|---|---|---|---|
| 14 | | InGaAs | Lattice match to InP | | 120 + 30 | $1 \times 10^{19}$ CBr + Zn |
| 13 | | InGaAsP | | 1100 | 50 | $1.5 \times 10^{18}$ Zn |
| 12 | | InP | | | 2340 ( or 1340) | $1 \times 10^{18}$ Zn |
| 11 | | InGaAsP | | 1100 | 20 | $1 \times 10^{18}$ Zn |
| 10 | | AlInAs | | | 60 | $1 \times 10^{17}$ to $1 \times 10^{18}$ Zn |
| 9 | | AlInAs | | 843 | 60 | $1 \times 10^{17}$ Zn |
| 8 | | AlInGaAs | | 968 | 70 | |
| 7 | 12× | AlInGaAs | | 1127 | 7 | |
| 6 | 12× | AlInGaAs | | 1245 | 9 | |
| 5 | | AlInGaAs | | 1127 | 7 | |
| 4 | | InGaAsP | | 1100 | 117 | |
| 3 | | InP | | | 80 | $2 \times 10^{17}$ Si |
| 2 | | InP | | | 70 | $5 \times 10^{17}$ Si |
| 1 | | InP | | | 1920 | $8 \times 10^{17}$ Si |
| 0 | InP Substrate | | | | | |

TABLE 4

| Layer | Multiplier | Material | Composition | Wavelength (nm) | Thickness (nm) | Doping (cm$^{-3}$) |
|---|---|---|---|---|---|---|
| 7 | | InGaAs | Lattice match to InP | | 120 + 30 | $1 \times 10^{19}$ CBr + Zn |
| 6 | | InGaAsP | | 1100 | 50 | $1.5 \times 10^{18}$ Zn |
| 5 | | InP | | | 2340 (or 1340) | $1 \times 10^{18}$ Zn |
| 4 | | AlInGaAs | | 1280 | 340 | |
| 3 | | InP | | | 80 | $2 \times 10^{17}$ Si |
| 2 | | InP | | | 70 | $5 \times 10^{17}$ Si |
| 1 | | InP | | | 1920 | $8 \times 10^{17}$ Si |
| 0 | InP Substrate | | | | | |

Figure 13I:
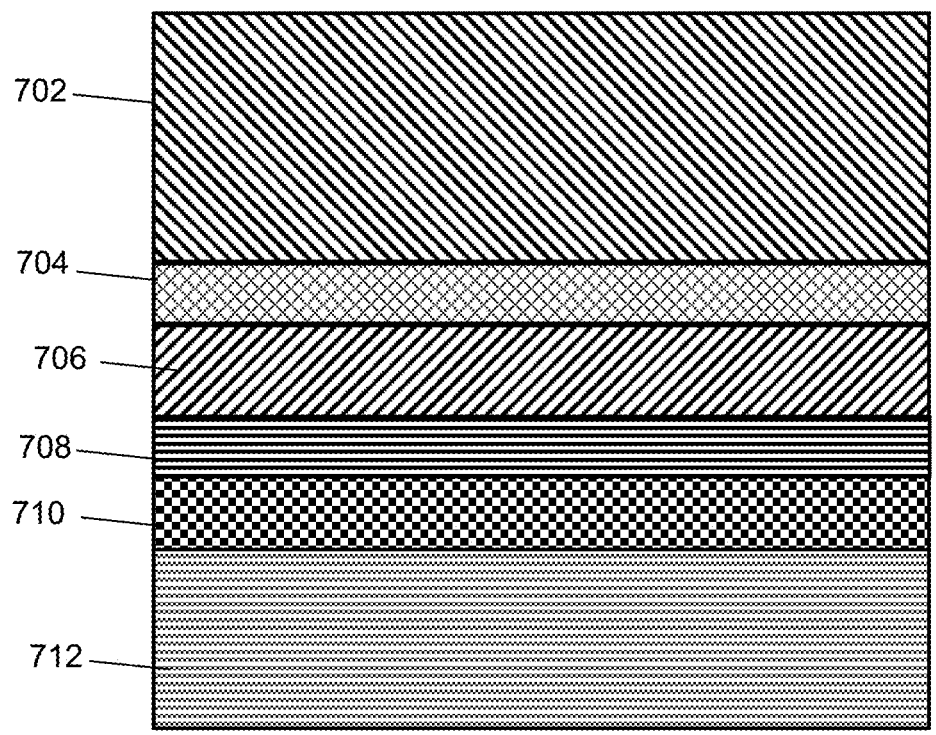
FIG. 13($i$)(A)-13($xix$)(B) show various fabrication steps of a device coupon.
Figure 13I:
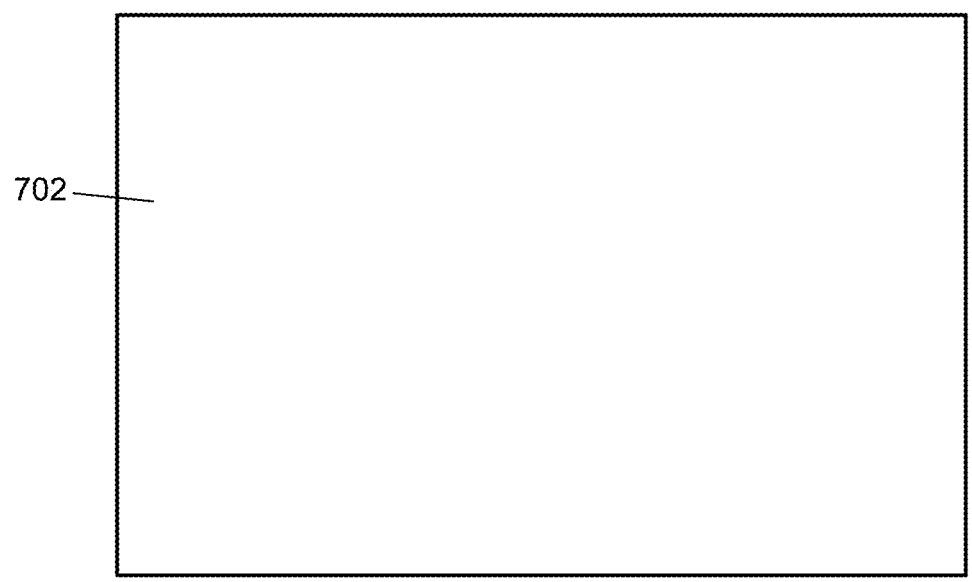
Figure 13:
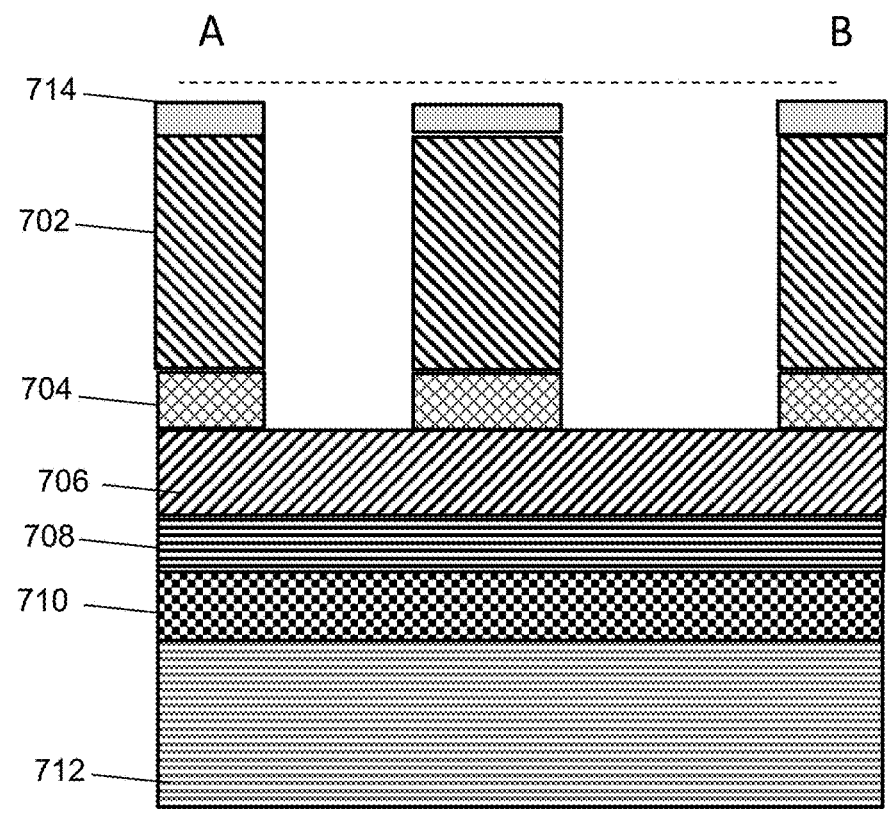
Figure 13:
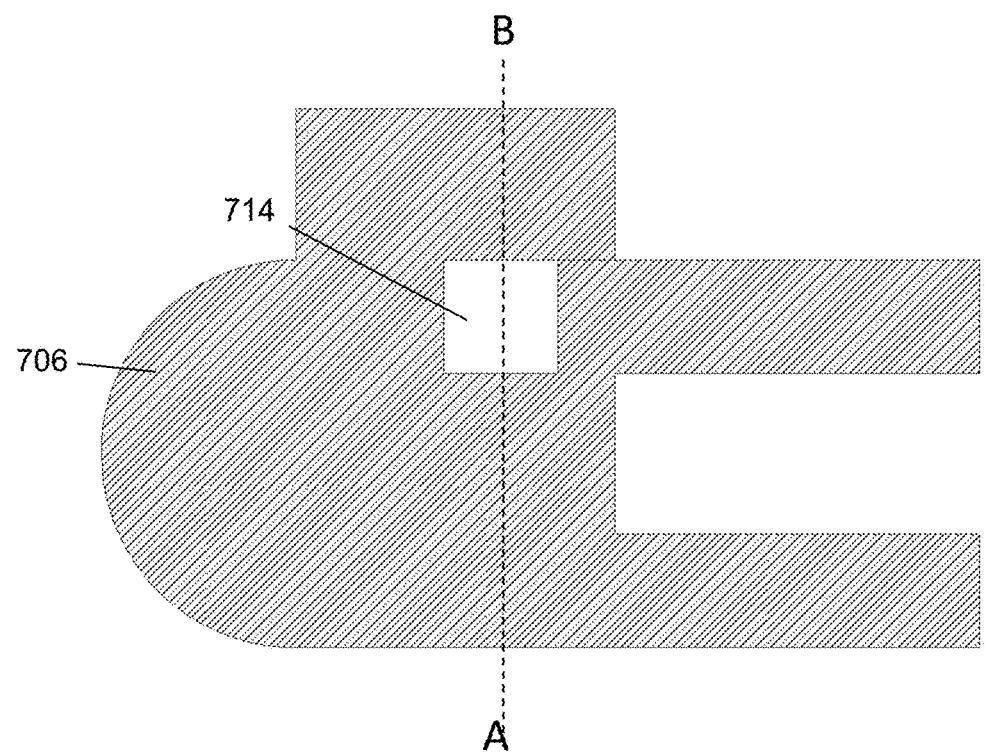
Figure 13:
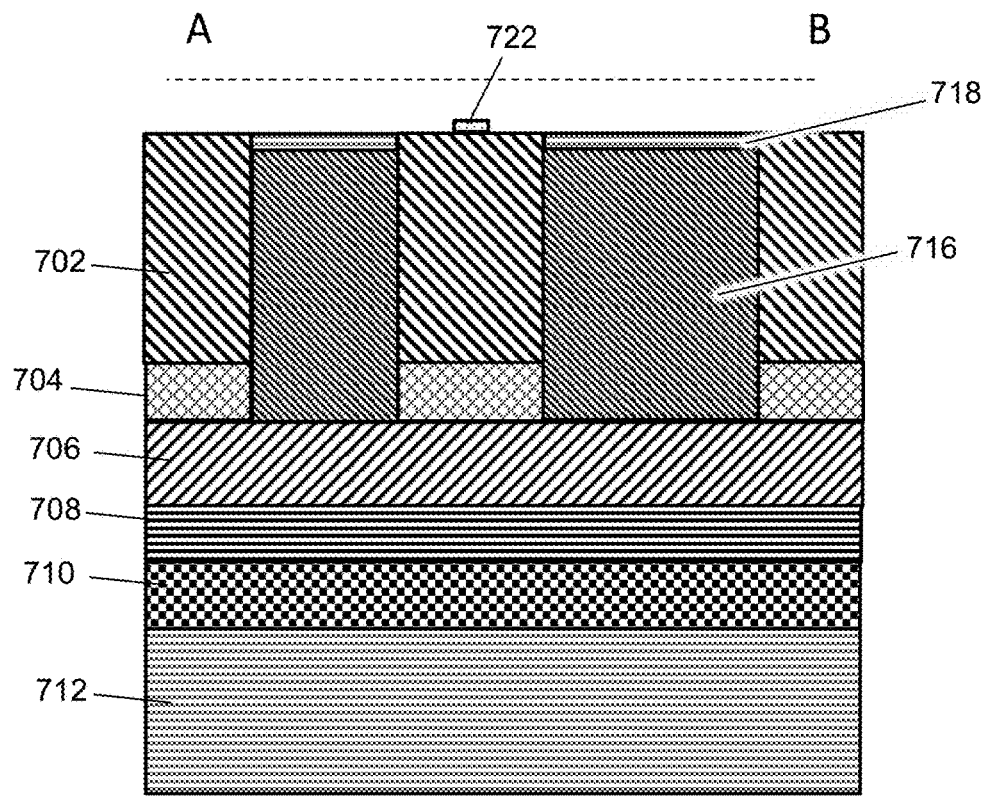
Figure 13:
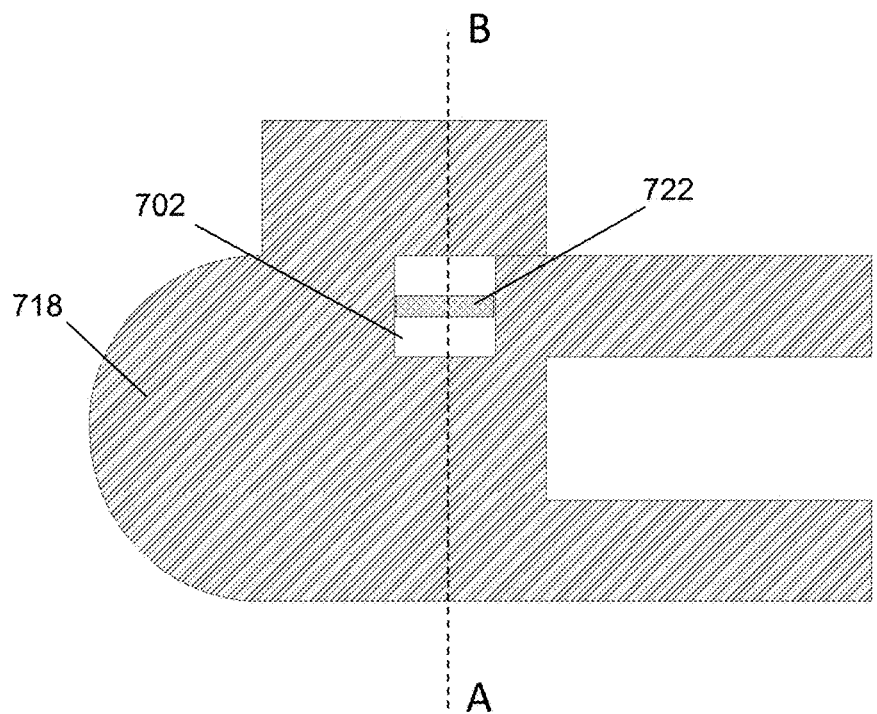
Figure 13V:
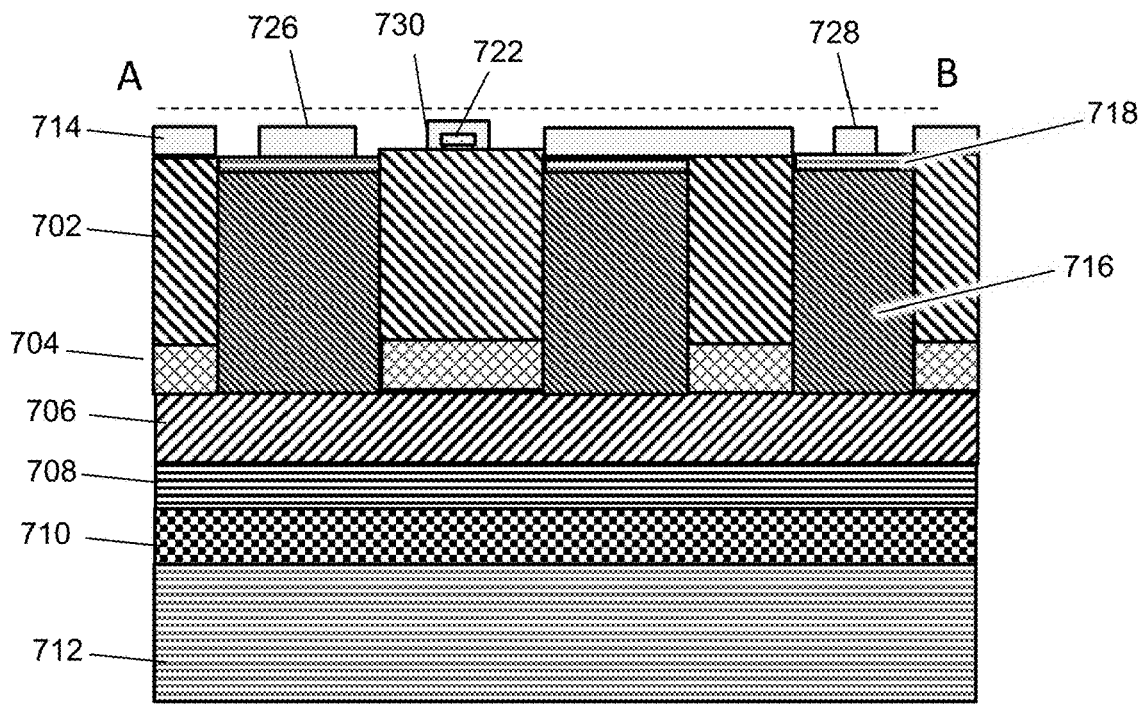
Figure 13V:
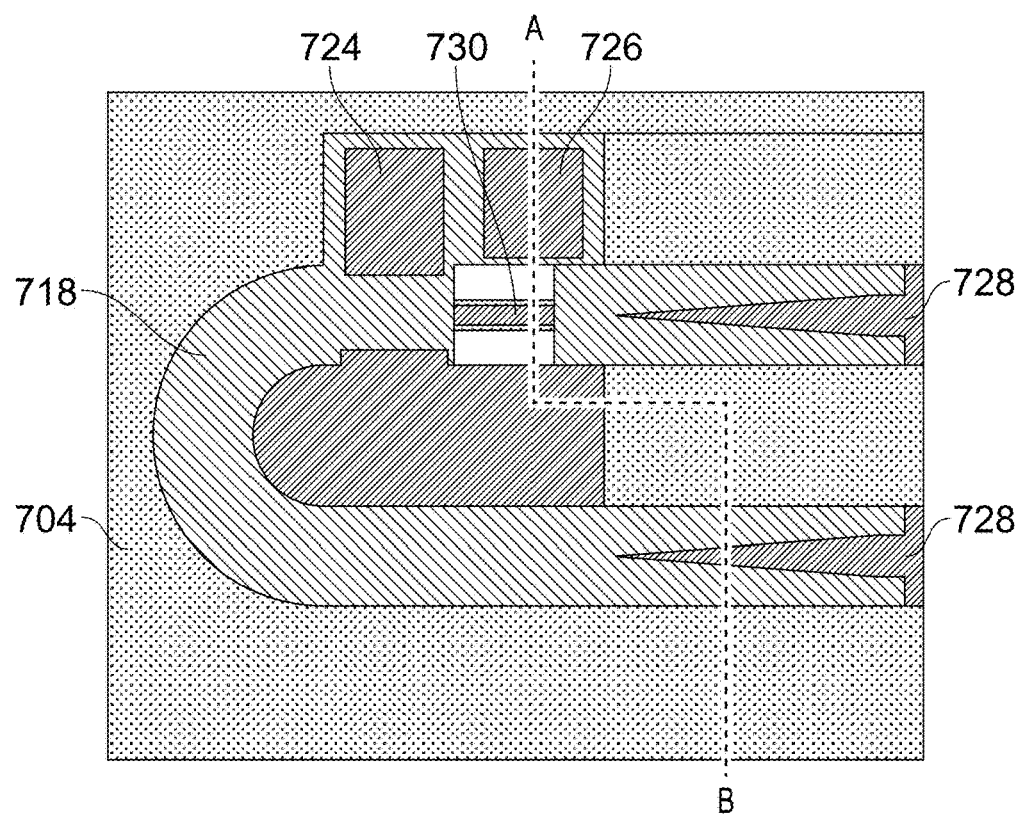
Figure 13:
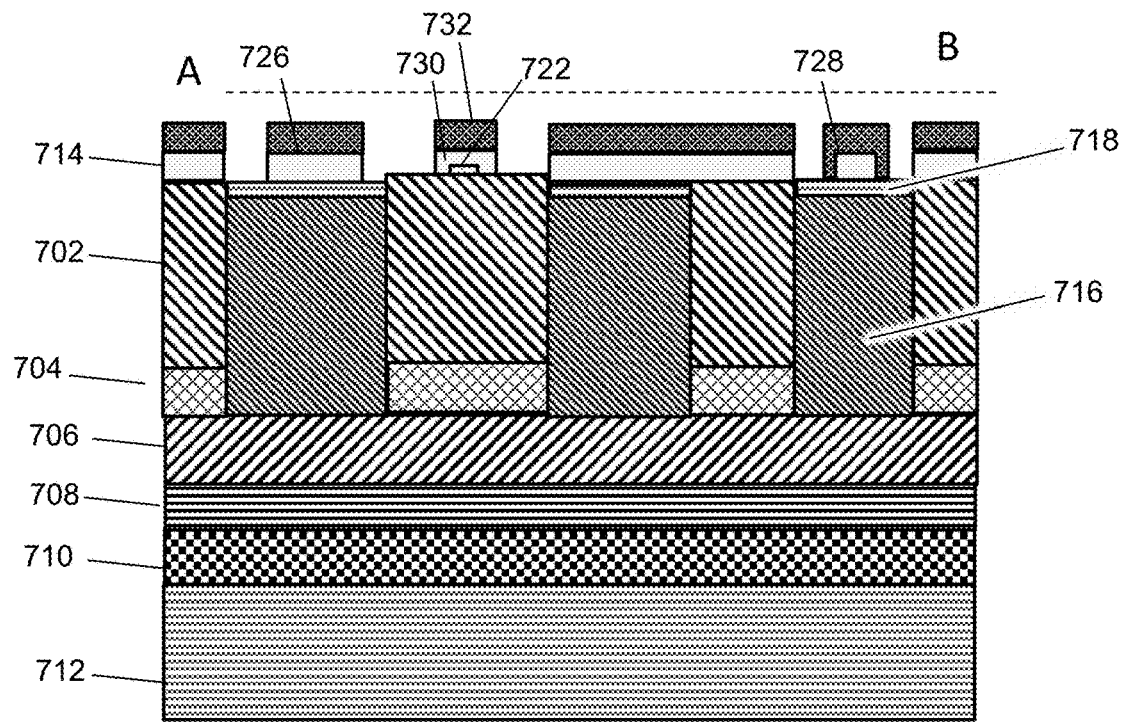
Figure 13:
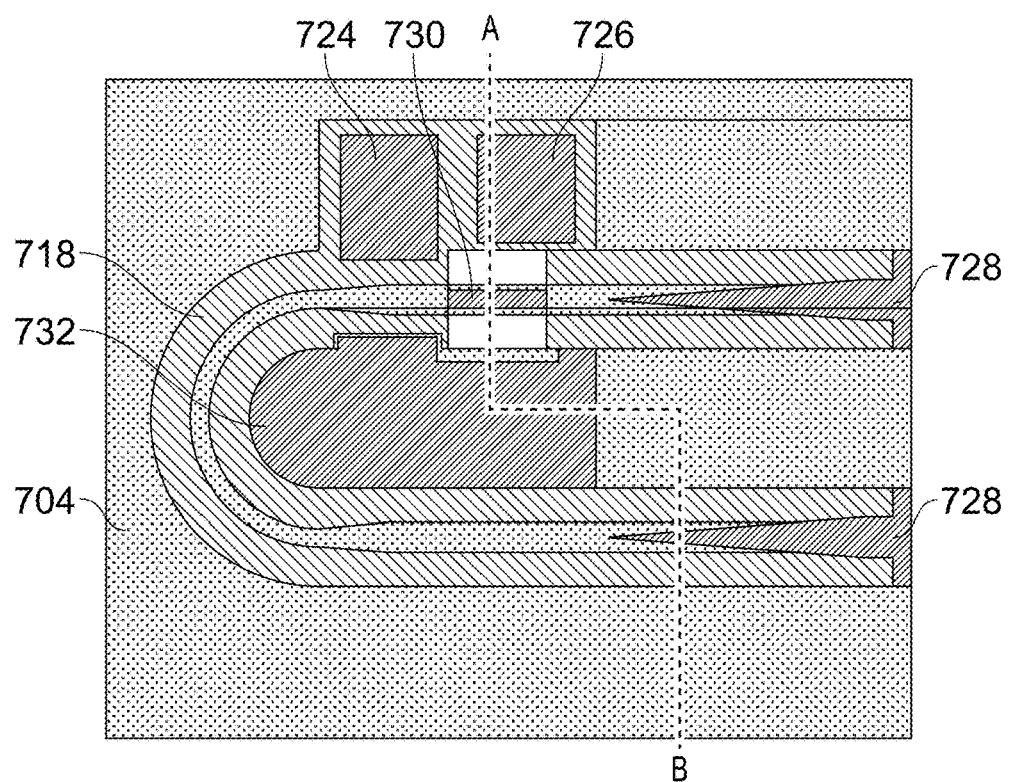
Figure 13:
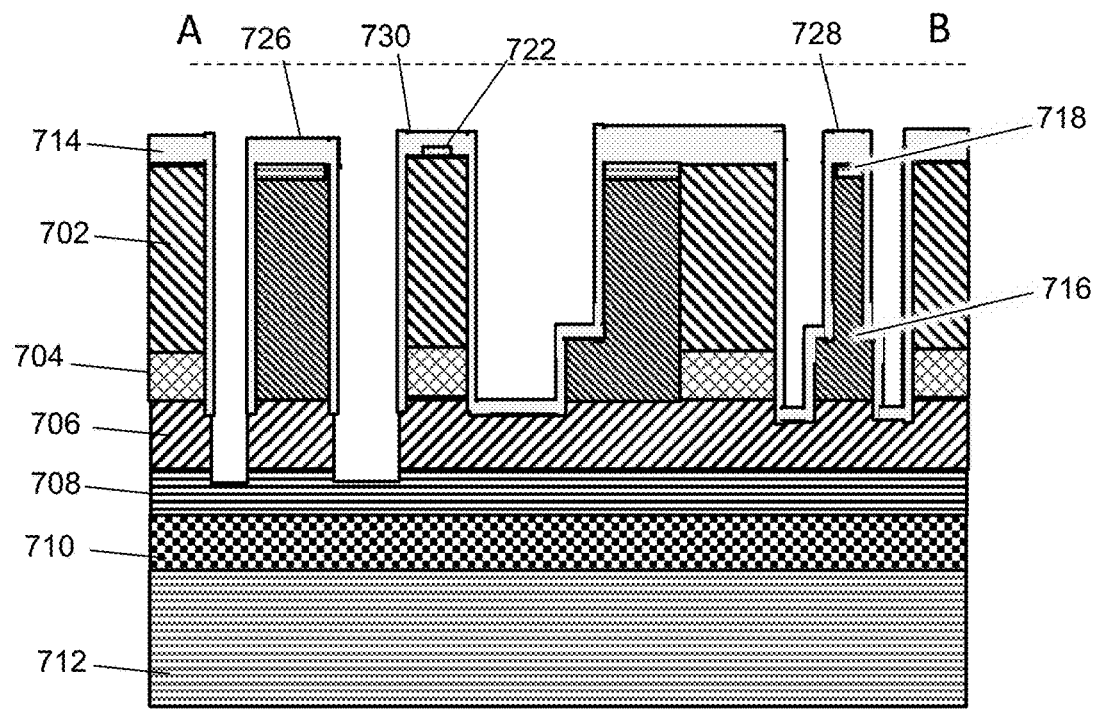
Figure 13:
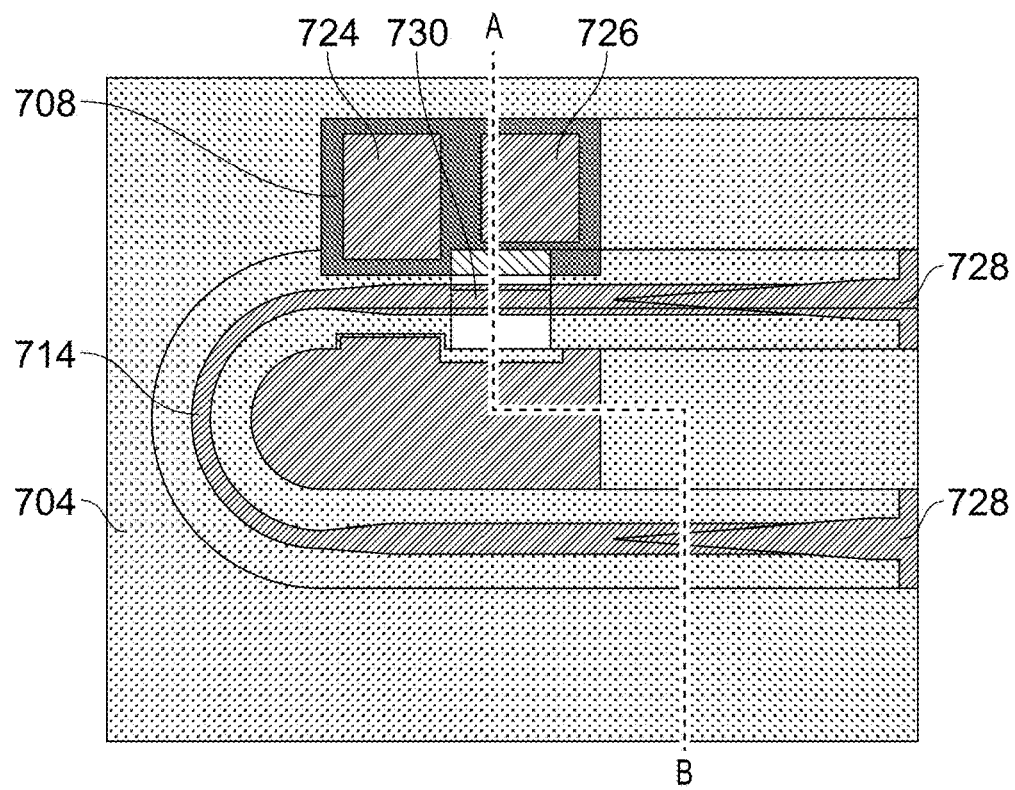
Figure 13X:
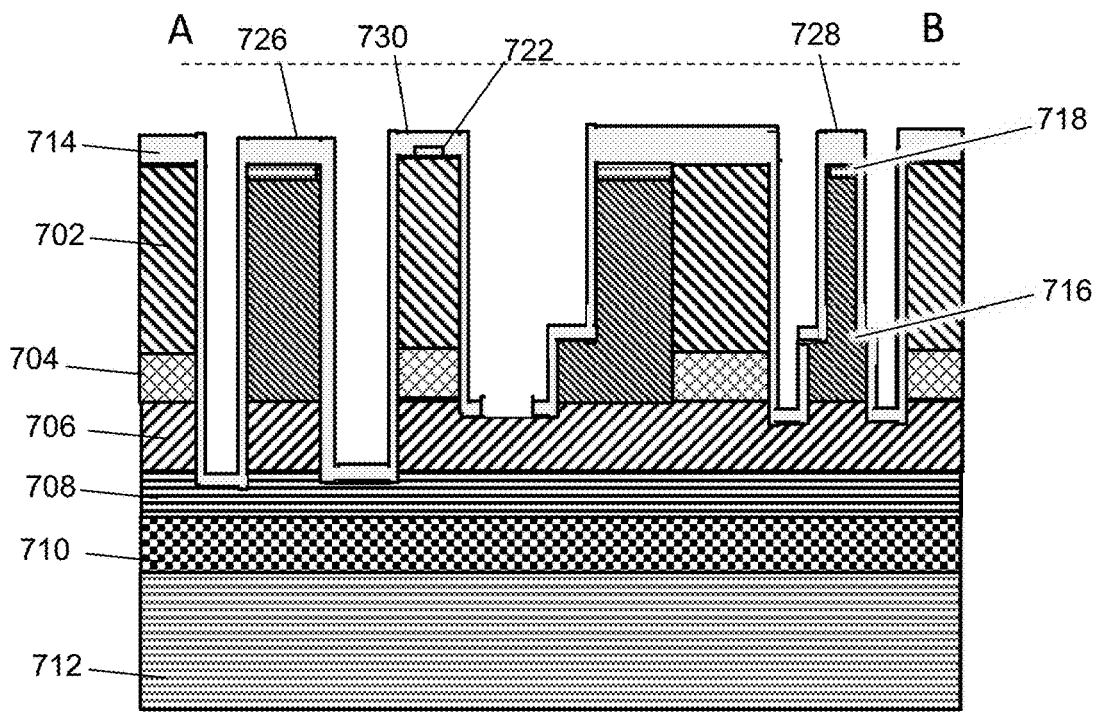
Figure 13X:
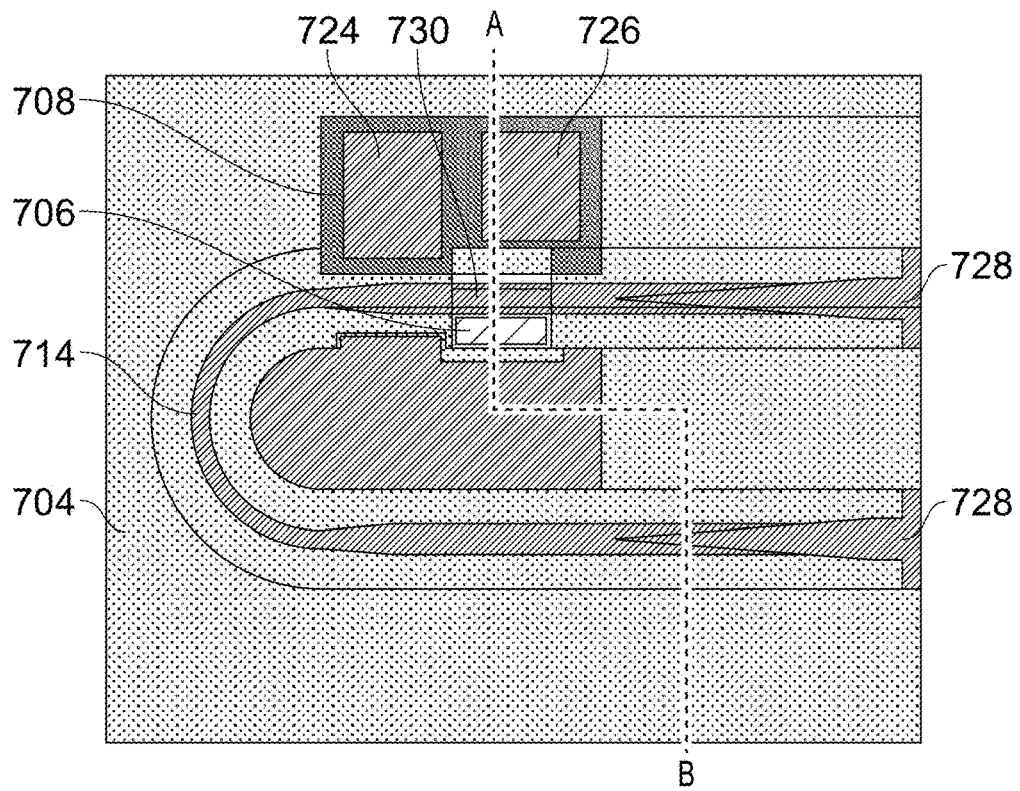
Figure 13:
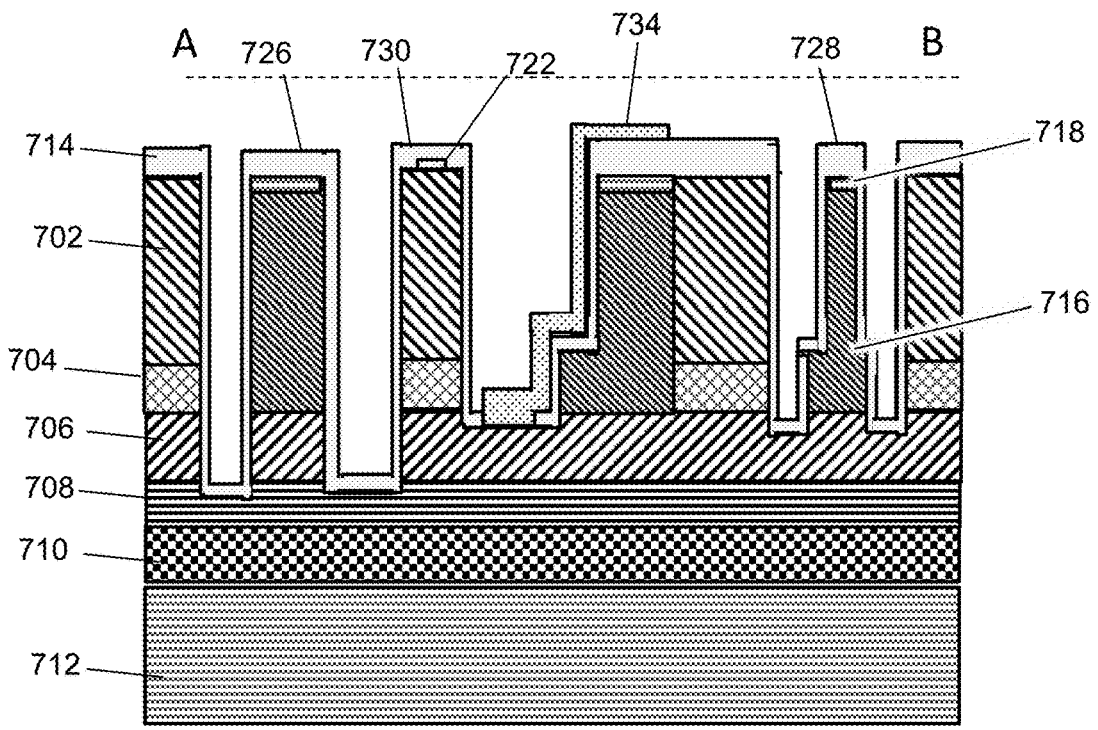
Figure 13:
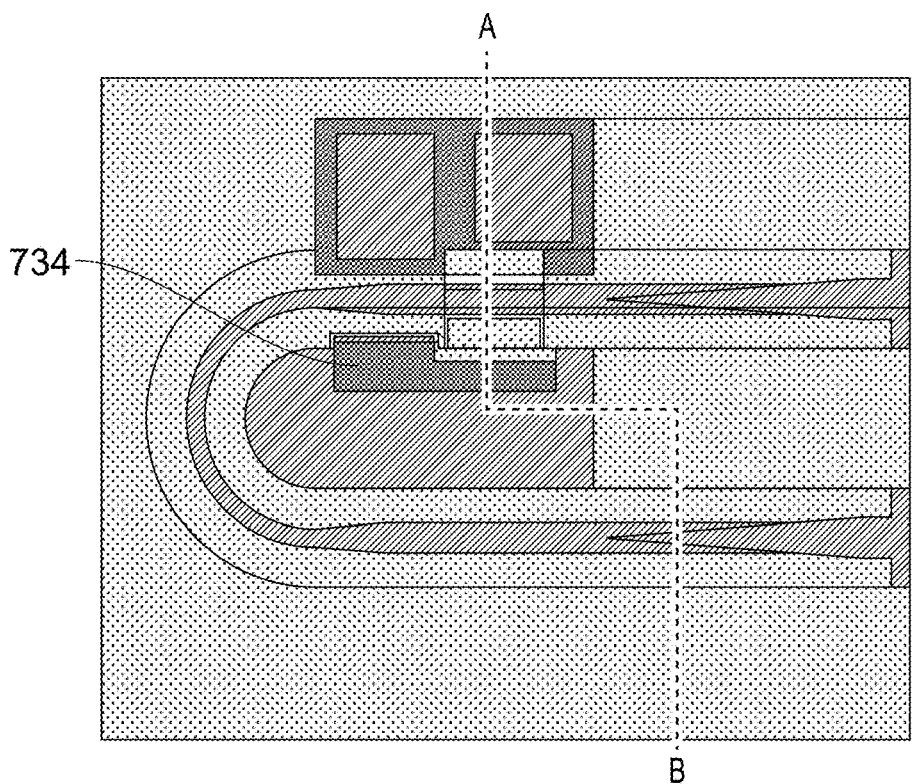
Figure 13:
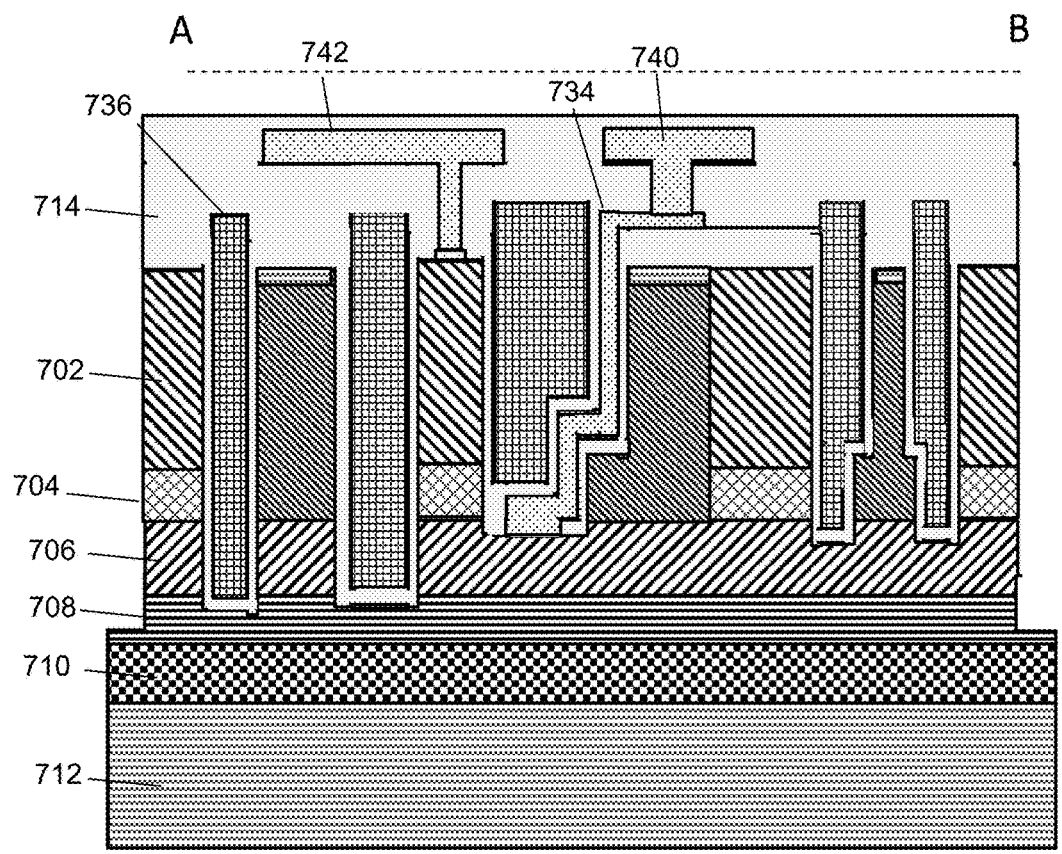
Figure 13:
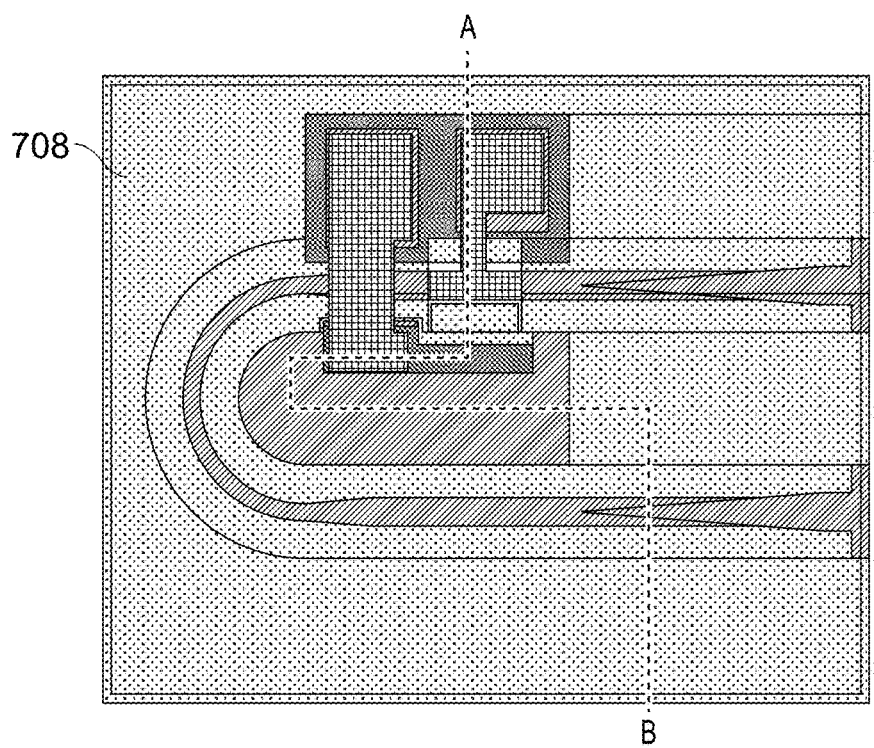

FIG. 13(*i*)(A)-13(*xix*)(B) show various fabrication steps of a device coupon. Throughout, the (A) Figure represents a section view, and the (B) Figure represents a top-down view.

In a first step, shown in FIGS. 13(*i*)(A) and 13(*i*)(B), a III-V multi-layered stack is provided and shown schematically in FIG. 13(*i*)(A). The stack comprises one or more P-doped InP layers 702, one or more quantum well (QW) active layers 704, one or more N-doped InP layers 706, one or more unintentionally doped InP layers 708, sacrificial layer 710, and InP substrate layer 712. The stack may be any one of the stacks discussed above with respect to tables 1-4.

Next, in a first variant of the method termed 'option 1' and shown in FIGS. 13(*ii*)(A) and 13(*ii*)(B), an etch is performed through the P—InP layer(s) 702 and through the QW active layer(s) 704, stopping at the N—InP layer(s) 706. This etching step includes the deposition of a silicon dioxide hard mask 714 over the upper surface of the stack, the geometry of the hard mask defines the subsequently formed passive waveguide areas (as shown in the top-down view of FIG. 13(*ii*)(B)).

Alternatively, in a second variant of the method termed 'option 2' and shown in FIGS. 13(*ii'*)(A) and 13(*ii'*)(B), an etch is performed through the P—InP layer(s) 702, the QW active layer(s) 704, and through the N—InP layer(s) 706, stopping at the UID-InP layer(s) 708. As with option 1, this step includes the deposition of a silicon hard mask 714 over the upper surface of the stack, the geometry of the hard mask defining the subsequently formed passive waveguide areas (as shown in the top-down view of FIG. 13(*ii'*)(B)). In contrast to option 1, the variant option 2 eliminates subsequent processing which would be required to isolate the optically active device once formed.

For the option 1 variant, the method then moves to a step shown in FIGS. 13(*iii*)(A) and 13(*iii*)(B), in which a AlIn- GaAs passive waveguide layer 716 is regrown from exposed the N—InP layer 706. This passive waveguide is around 3 μm tall in this example, and is capped with undoped/ unintentionally doped InP layer 718 so that the upper surface of the UID InP layer 718 is level with the P—InP layer(s) 702. Whilst in this example the passive waveguide layer is formed from AlInGaAs, it can also be formed from any one of: InGaAsP, AlInAs, or any other III-V material with a bandgap of greater than or equal to 1.1 eV and a refractive index which is greater than that of InP.

For the option 2 variant, the method then moves to a step shown in FIGS. 13(*iii'*)(A) and 13(*iii'*)(B), in which an InP layer 720 is first grown from the exposed UID-InP layer 708. The InP layer 720 is grown to have a thickness equal to the adjacent N—InP layers 706. After this, the passive waveguide layer 716 is grown as per option 1. The InP layer 720 may either be undoped or doped with iron.

The following steps are applicable to both variants, but are shown for convenience for option 1 only. In a step shown in FIGS. 13(*iv*)(A) and 13(*iv*)(B), the silicon dioxide hard mask is removed and a metal seed electrode is deposited. This deposition may be performed via a lift off process, and is located above what will become the active waveguide. In this example the seed electrode has a thickness of around 0.2 μm, and is formed mainly from gold.

Next, in a step shown in FIGS. 13(*v*)(A) and 13(V)(B), further silicon dioxide 714 is deposited and patterned so as to define masks for: an N-pad mesa 724; a P-pad mesa 726; waveguide taper regions 728; and active waveguide 730. After the SiO$_2$ is patterned, silicon nitride 732 is deposited over the SiO$_2$ and patterned as shown in FIGS. 13(*vi*)(A) and 13(*vi*)(B). The silicon nitride may have a composition of Si$_3$N$_4$, and is used as it has a good selectivity to SiO$_2$ and III-V semiconductors.

The unmasked portions are then etched to provide mesas for the N- and P-pads, the waveguide taper regions, and the active waveguide. The result of this etch is shown in FIGS. 13(*vii*)(A) and 13(*vii*)(B). The etch is around 700 nm deep, which represents a 100 nm over-etch. The silicon nitride is then removed, and the etch continued to remove around 2.4 μm with SiO$_2$ hard mask 714 (or 1.2 μm fora 1.8 μm passive waveguide) of the III-V material and so reach the N—InP layer(s) 706. A 100 nm over-etch is usually performed to ensure that the N—InP layer(s) 706 is exposed. This is shown in FIGS. 13(viii)(A) and 13(viii)(B). Notably, a step 731 is etched into a portion of the device which facilitates subsequent deposition of a seed electrode to eliminate the possibility of electrode disconnection on the edge due to the large step depth.

Next, in examples of the option 1 variant, further silicon dioxide 714 is deposited patterned so as to define isolation regions through the N—InP layer(s) 706. This step is omitted for option 2 examples as the previous etch through the N—InP layer(s) 706 negates the need for subsequent isolation etches. This is shown in FIGS. 13(*ix*)(A) and 13(*ix*)(B).

In both variants, the method moves to a step shown in FIGS. 13(*x*)(A) and 13(*x*)(B) in which further silicon dioxide 714 is deposited and patterned to open a via through the N—InP layer 706 adjacent to the active waveguide. Next, as shown in FIGS. 13(*xi*)(A) and 13(*xi*)(B), a metal electrode 734 is deposited via a lift off process. In this example, the electrode is formed mainly from gold and is around 0.4 μm thick.

After the seed electrode is formed, further silicon dioxide is deposited and the structure is spun coated in Benzocyclobutene (BCB) 736, or another suitable dielectric. After the BCB is cured and etched back, another layer of silicon dioxide is deposited. The result of this is shown in FIGS. 13(*xii*)(A) and 13(*xii*)(B). Then vias 738 are opened for contact to the N and P seed electrodes 722 and 734 as shown in FIGS. 13(xiii)(A) and 13(xiii)(B). This allows P electrode 742 and N electrode 740 to be deposited so that they are in electrical communication with the corresponding seed electrodes as shown in FIGS. 13(*xiv*)(A) and 13(*xiv*)(B).

Figure 14A:
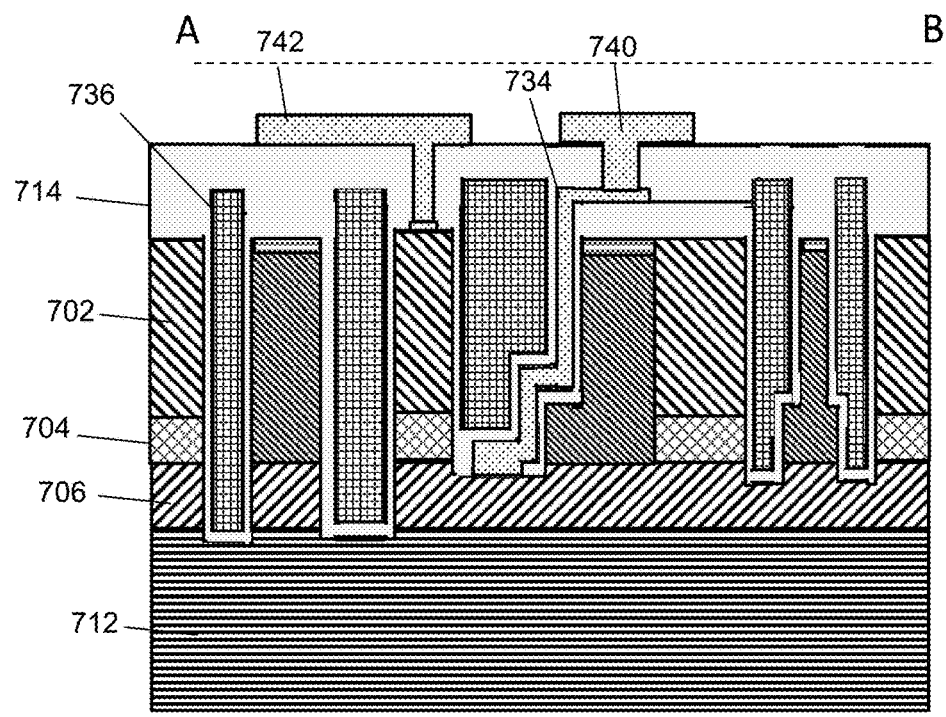
FIGS. 14(A) and 14(B) show a cross-section and top-down view respectively of a device coupon containing an EAM for use in a flip-chip bonding process.
Figure 14B:
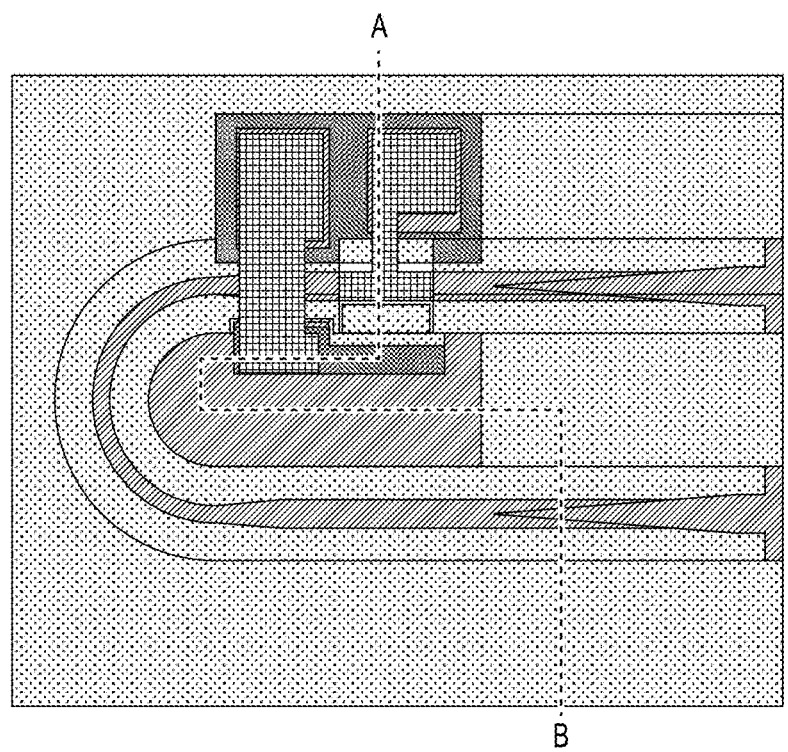

For device coupons to be used in a flip-chip bonding process with cleaved facets, the method then moves to a wafer thinning and device cleaving step (shown in FIGS. 14(A) and 14(B).

Otherwise, the method moves to a step shown in FIGS. 13(*xv*)(A) and 13(*xv*)(B) in which further silicon dioxide is deposited and patterned so as to define the waveguide facets 114 and 116, and the unmasked regions are then etched to provide the facets. Next, in a step shown in FIGS. 13(*xvi*)(A) and 13(*xvi*)(B) an anti-reflective coating 744 is provided over the exposed lateral and upper sides of the transfer die. For device coupons to be used in a flip-chip bonding process with etched facets, the method then includes a step of dicing or cleaving (shown in FIGS. 15(A) and 15(B). Otherwise, the method moves to a step shown in FIGS. 13(xvii)(A) and 13(xvii)(B) where a protection etch is performed to expose lateral sides of the UID-InP layer(s) 708 and the sacrificial layer 710. After this, in a step shown in FIGS. 13(xviii)(A) and 13(xviii)(B), a photoresist tether 746 is deposited over the exposed surfaces of the device coupon. This allows a subsequent release etching, shown in FIGS. 13(*xix*)(A) and 13(*xix*)(B), to be performed which removes the sacrificial layer 710. The device coupon is then ready for microtransfer printing.

FIGS. 14(A) and 14(B) show a cross-section and top-down view respectively of a device coupon containing an EAM for use in a flip-chip bonding process.

Figure 15A:
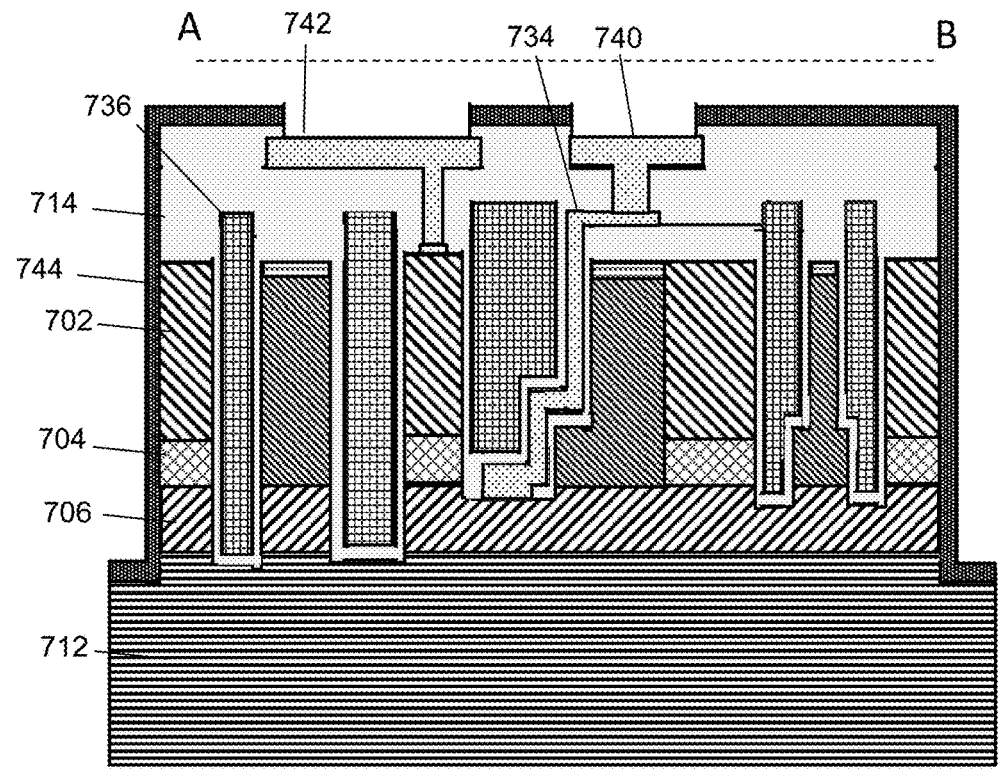
FIGS. 15(A) and 15(B) show a cross-section and top-down view respectively of a variant device coupon containing an EAM for use in a flip-chip bonding process.
Figure 15B:
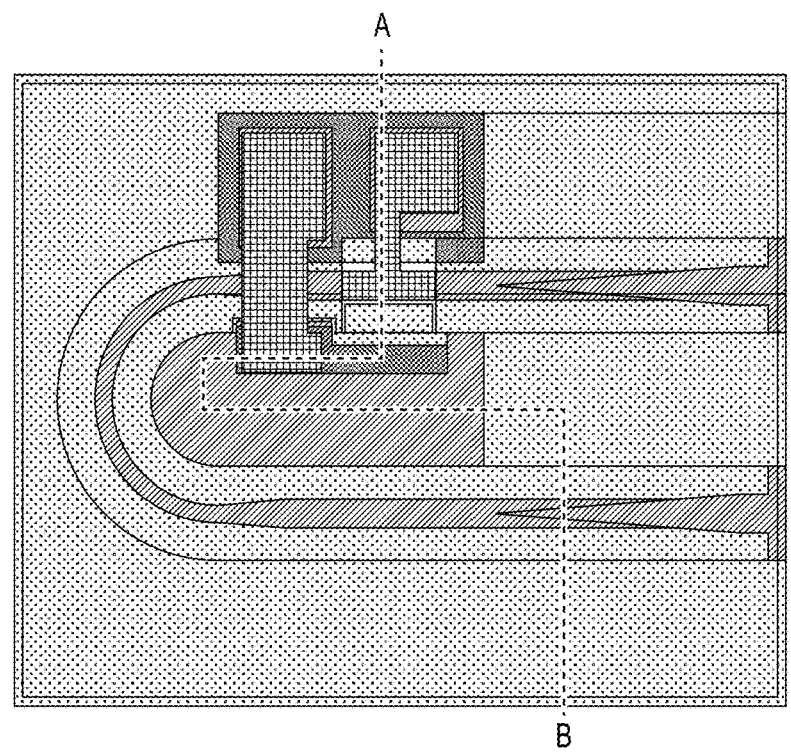

FIGS. 15(A) and 15(B) show a cross-section and top-down view respectively of a variant device coupon containing an EAM for use in a flip-chip bonding process.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

LIST OF FEATURES

| | |
|---|---|
| 100 | Device coupon |
| 102 | Input waveguide |
| 104 | Active waveguide |
| 106 | Output waveguide |
| 108 | Bend |
| 110 | Input waveguide mode converter |
| 112 | Output waveguide mode converter |
| 114 | Input facet |
| 116 | Output facet |
| 150 | Silicon platform |
| 152 | Silicon input waveguide |
| 154 | Silicon output waveguide |
| 202 | Silicon substrate |
| 204 | Buried oxide layer |
| 206 | Silicon-on-insulator waveguide |
| 208, 212 | Antireflective coating |
| 210 | Benzocyclobutene fill |
| 214 | Indium phosphide bottom cladding |
| 216 | AlInGaAs passive waveguide |
| 218 | Indium phosphide upper cladding |

| | |
|---|---|
| 220 | Electro-optically active device |
| 222 | N-doped indium phosphide layer |
| 224 | III-V semiconductor quantum well layer |
| 226 | P-doped InP/III-V semiconductor layer |
| 400 | Device coupon |
| 402 | Cleaved input facet |
| 404 | Cleaved output facet |
| 502 | Indium phosphide substrate |
| 600, 650 | Device coupon |
| 602 | Input waveguide bend |
| 604 | Output waveguide bend |
| 702 | P-InP layer(s) |
| 704 | QW active layer(s) |
| 706 | N-InP layer(s) |
| 708 | UID-InP layer(s) |
| 710 | Sacrificial layer |
| 712 | In-P substrate |
| 714 | $SiO_2$ |
| 716 | AlInGaAs |
| 718 | UID-InP |
| 720 | InP |
| 722 | Au seed electrode |
| 724 | Mask for N-pad mesa |
| 726 | Mask for P-pad mesa |
| 728 | Taper mask |
| 730 | Active waveguide mask |
| 731 | Step |
| 732 | $Si_3N_4$ hard mask |
| 734 | Au seed electrode |
| 736 | Benzocyclobutene fill |
| 738 | Via |
| 740 | N electrode |
| 742 | P electrode |
| 744 | Antireflective coating |
| 746 | Photoresist tether |

The invention claimed is:

1. A device coupon for use in a hybrid integration process with a silicon platform, the device coupon comprising:
an input waveguide, including an input facet;
an active waveguide, coupled to the input waveguide, the active waveguide including a III-V semiconductor based electro-optical device; and
an output waveguide, configured to couple light between the active waveguide and an output facet,
wherein the input waveguide and output waveguide are passive waveguides, and
wherein a waveguide from among the input and output waveguides contains a bend, and a width of the bend, in a direction parallel to a plane of a top surface of the waveguide containing the bend, is less than a width of the active waveguide in a direction parallel to the plane.

2. The device coupon of claim 1, wherein both of the input waveguide and output waveguide contains a bend.

3. The device coupon of claim 2, wherein the bend in each of the input and output waveguides has a width which is less than that of the active waveguide.

4. The device coupon of claim 1, wherein the bend has a width of no more than 1 μm.

5. The device coupon of claim 1, wherein one or both of the input waveguide and output waveguide is formed from a III-V semiconductor.

6. The device coupon of claim 1, wherein the active waveguide is formed from a III-V semiconductor.

7. The device coupon of claim 1, wherein one or both of the input waveguide and output waveguide comprises a mode converter, configured to convert an optical mode of light transmitted therethrough.

8. The device coupon of claim 1, wherein the III-V semiconductor based electro-optical device is an electro-absorption modulator.

9. The device coupon of claim 1, wherein the active waveguide is a straight waveguide having a rectilinear geometry.

10. The device coupon of claim 1, wherein an optical path length of the active waveguide is smaller than an optical path length of the input waveguide and/or output waveguide.

11. The device coupon of claim 1, where the input facet and output facet are on a same lateral side of the device coupon.

12. The device coupon of claim 1, wherein the device coupon includes an antireflective coating, disposed over one or more lateral side of the device coupon.

13. The device coupon of claim 1, wherein the device coupon includes a first and a second contact pad, each contact pad electrically connected to a respective layer in the III-V semiconductor based electro-optical device.

14. The device coupon of claim 1, wherein the input facet and/or output facet are T-bar facets.

15. The device coupon of claim 1, wherein the input waveguide and/or output waveguide have a width of no more than 4 μm.

16. An optoelectronic device, comprising a silicon platform and the device coupon of claim 1, wherein:
the device coupon is bonded to the silicon platform;
the input waveguide of the device coupon is coupled to an input waveguide of the silicon platform via the input facet; and
the output waveguide of the device coupon is coupled to an output waveguide of the silicon platform via the output facet.

17. A method of fabricating an optoelectronic device, comprising bonding the device coupon of claim 1 to a silicon platform.

18. A method of fabricating the device coupon of claim 1, the method comprising the steps of:
growing a multi-layered III-V semiconductor based stack;
fabricating the active waveguide, the active waveguide including the III-V semiconductor based electro-optical device, from the stack;
fabricating the input waveguide, which is configured to couple light between the input facet and the active waveguide, on the stack; and
fabricating the output waveguide, which is configured to couple light between the active waveguide and the output facet, on the stack.

19. The method of claim 18, wherein fabricating the input waveguide and/or output waveguide comprises a step of: etching away a portion of the stack and epitaxially growing the input waveguide and/or output waveguide from an exposed surface of the stack.

20. The method of claim 18, wherein fabricating the active waveguide comprises etching away one or more portions of the stack so as to define the active waveguide.

* * * * *